US009445356B2

(12) United States Patent
Balasubramanian et al.

(10) Patent No.: US 9,445,356 B2
(45) Date of Patent: Sep. 13, 2016

(54) DISTRIBUTED MOBILE ACCESS POINT ACQUISITION

(71) Applicant: QUALCOMM Incorporated, San Diego, CA (US)

(72) Inventors: Srinivasan Balasubramanian, San Diego, CA (US); Manoj Madhukar Deshpande, San Diego, CA (US); Sanjiv Nanda, Ramona, CA (US); Jen Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 14/216,456

(22) Filed: Mar. 17, 2014

(65) Prior Publication Data

US 2014/0199998 A1    Jul. 17, 2014

Related U.S. Application Data

(63) Continuation of application No. 12/243,814, filed on Oct. 1, 2008, now Pat. No. 8,711,767.

(60) Provisional application No. 60/978,744, filed on Oct. 9, 2007, provisional application No. 60/978,746, filed on Oct. 9, 2007, provisional application No. 60/978,747, filed on Oct. 9, 2007, provisional application No. 60/978,750, filed on Oct. 9, 2007.

(51) Int. Cl.
*H04W 4/00* (2009.01)
*H04W 48/16* (2009.01)
(Continued)

(52) U.S. Cl.
CPC .......... *H04W 48/16* (2013.01); *H04J 11/0093* (2013.01); *H04W 12/08* (2013.01);
(Continued)

(58) Field of Classification Search
CPC ... H04W 48/16; H04W 12/08; H04W 48/18; H04W 88/00; H04W 36/00; H04W 36/0083; H04W 48/08
USPC .......................................... 370/328
See application file for complete search history.

(56) References Cited

U.S. PATENT DOCUMENTS 6,148,197 A    11/2000 Bridges et al.
6,934,544 B2    8/2005 Cooper et al.
(Continued)

FOREIGN PATENT DOCUMENTS

JP    2003259457 A    9/2003
JP    2004297482 A    10/2004
(Continued)

OTHER PUBLICATIONS

"WO 2006/138338 A2".*
(Continued)

*Primary Examiner* — Gregory Sefcheck
*Assistant Examiner* — Majid Esmaeilian
(74) *Attorney, Agent, or Firm* — Dalei Dong

(57) ABSTRACT

Providing for distributed access point management for access to a mobile network is described herein. By way of example, an interface application maintained at a Femto cell base station (BS) can facilitate initial power up and/or acquisition for a Femto user terminal (UT). Upon start-up, a bootstrap process is utilized by the Femto cell to provision the UT with an SDL establishing at least one BS as high priority within a particular geographic area (GEO). Thus, when the Femto UT is within the GEO, the UT is more likely to acquire, camp on and/or handoff to the preferred BS. When outside the GEO, a serving access point can provision the Femto UT OTA with a custom SDL suited to another GEO having a different high priority access point. By implementing access point management at distributed access points, expensive network equipment can be mitigated or avoided.

30 Claims, 18 Drawing Sheets

(51) Int. Cl.
*H04J 11/00* (2006.01)
*H04W 12/08* (2009.01)
*H04W 48/18* (2009.01)
*H04W 88/00* (2009.01)
*H04W 48/08* (2009.01)
*H04W 36/00* (2009.01)
*H04W 88/08* (2009.01)

(52) U.S. Cl.
CPC ........... *H04W 48/18* (2013.01); *H04W 88/00* (2013.01); *H04W 36/00* (2013.01); *H04W 36/0083* (2013.01); *H04W 48/08* (2013.01); *H04W 88/08* (2013.01)

(56) References Cited

U.S. PATENT DOCUMENTS

| | | | |
|---|---|---|---|
| 7,020,439 | B2 | 3/2006 | Sinivaara et al. |
| 8,711,767 | B2 | 4/2014 | Balasubramanian et al. |
| 2007/0019575 | A1 | 1/2007 | Shaheen |
| 2007/0097938 | A1 | 5/2007 | Nylander et al. |
| 2007/0097939 | A1 | 5/2007 | Nylander et al. |
| 2007/0183427 | A1 | 8/2007 | Nylander et al. |
| 2008/0049694 | A1 | 2/2008 | Kinoshita et al. |
| 2008/0267153 | A1* | 10/2008 | Mukherjee ............ H04L 63/104 370/338 |
| 2009/0047960 | A1* | 2/2009 | Gunnarsson ......... H04J 11/0093 455/436 |
| 2009/0047968 | A1* | 2/2009 | Gunnarsson .......... H04W 48/12 455/446 |
| 2009/0092080 | A1 | 4/2009 | Balasubramanian et al. |
| 2009/0264126 | A1* | 10/2009 | Khetawat ............. H04L 63/104 455/435.1 |

FOREIGN PATENT DOCUMENTS

| | | |
|---|---|---|
| JP | 2007006320 A | 1/2007 |
| JP | 2009510969 A | 3/2009 |
| JP | 2009515386 A | 4/2009 |
| RU | 95108251 | 12/1997 |
| WO | WO-9940746 | 8/1999 |
| WO | WO-03067917 | 8/2003 |
| WO | WO-2005115034 A1 | 12/2005 |
| WO | WO-2006124840 A1 | 11/2006 |
| WO | WO-2007040449 A1 | 4/2007 |
| WO | WO-2007040454 A2 | 4/2007 |
| WO | WO-2007052111 A1 | 5/2007 |
| WO | WO-2007111860 A2 | 10/2007 |

OTHER PUBLICATIONS

3GPP TSG RAN WG2, "LS on Closed Subscriber Groups for LTE Home Cells", Internet Citation, Aug. 20, 2007, XP002469020, Retrieved from the Internet, URL: http://www.3gpp.org/ftp/tsg_ran/WG4_Radio/TSGR4_44/Docs/R4-071224.zip [retrieved on Feb. 14, 2008].
European Search Report—EP14172605—Search Authority—Munich—Oct. 28, 2014.
Vodafone, Telecom Italia : "Mobility Management Identifiers in EPS Entities",C1-071669,3GPP TSG CT WG1 Meeting #48,Aug. 24, 2007.
Co-pending U.S. Appl. No. 09/021,648, filed Feb. 10, 1998.
International Search Report, PCT/US2008/078711, International Searching Authority, European Patent Office, Feb. 24, 2009.
Taiwan Search Report—TW097139079—TIPO—Sep. 28, 2012.
Written Opinion, PCT/US2008/078711, International Searching Authority, European Patent Office, Feb. 24, 2009.

* cited by examiner

DISTRIBUTED MOBILE ACCESS POINT ACQUISITION

CLAIM OF PRIORITY

The present application for patent is a Continuation of U.S. application Ser. No. 12/243,814, entitled "DISTRIBUTED MOBILE ACCESS POINT ACQUISITION", filed on Oct. 1, 2008, which in turn claims priority to the following U.S. Provisional Applications:

Application No. 60/978, 744 entitled SYSTEM AND METHOD TO FACILITATE ACQUISITION OF ACCESS POINT BASE STATIONS filed Oct. 9, 2007;

Application No. 60/978,746 entitled SYSTEM AND METHOD TO OPTIMIZE ACQUISITION OF ACCESS POINT BASE STATIONS filed Oct. 9, 2007;

Application No. 60/978,747 entitled SYSTEM AND METHOD TO FACILITATE PREFERRED ROAMING LIST PROVISIONING IN ACCESS POINT BASE STATIONS filed Oct. 9, 2007; and Application No. 60/978,750 entitled SYSTEM AND METHOD TO FACILITATE A CENTRALIZED FEMTO PREFERRED ROAMING LIST CONFIGURATION filed Oct. 9, 2007; each of the foregoing are assigned to the assignee hereof and hereby expressly incorporated by reference herein.

REFERENCE TO CO-PENDING APPLICATIONS FOR PATENT

The present application for patent is related to the following co-pending U.S. patent application Ser. No. 12/243, 799, entitled "CENTRALIZED MOBILE ACCESS POINT ACQUISITION" by Srinivasan Balasubramanian et al., having Attorney Docket No. 072357U1, assigned to the assignee hereof, and expressly incorporated by reference herein.

BACKGROUND

I. Field

The following disclosure relates generally to wireless communication, and more specifically to managing remote access for devices in a mixed access point environment.

II. Background

Wireless communication systems are widely deployed to provide various types of communication (e.g., voice, data, multimedia services, etc.) to multiple users. Subscription based services allow users to access and utilize various communication content over a service provider's network. As the demand for high-rate and multimedia data services rapidly grows, there lies a challenge to implement efficient and robust communication systems with enhanced performance.

Traditional fixed line communication systems, such as digital subscriber line (DSL), cable line, dial-up, or like network access technologies offered by Internet service providers (ISPs), are alternative and sometimes competing communication platforms to wireless communications. However, in recent years users have begun replacing fixed line communications with mobile communications. Several advantages of mobile communication systems, such as user mobility, small relative size of user equipment (UE), and ready access to public switched telephone networks as well as the Internet, have made such systems very convenient and thus very popular. As users have begun relying more on mobile systems for communication services traditionally obtained through fixed line systems, demand for increased bandwidth, reliable service, high voice quality and low prices has heightened.

In addition to mobile phone networks currently in place, a new class of small base stations has emerged. These small base stations are low power and can typically utilize fixed line communications to connect with a mobile operator's core network. In addition, these base stations can be distributed for personal/private use in a home, office, apartment, private recreational facility, and so on, to provide indoor/outdoor wireless coverage to mobile units. These personal base stations are generally known as access point base stations, or, alternatively, as home Node B units (HNBs) or Femto cells. Femto cell base stations offer a new paradigm in mobile network connectivity, allowing direct subscriber control of mobile network access and access quality.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for centralized as well as distributed access management to diverse types of mobile network access points. In some aspects, network components can generate a system determination list (SDL) for a user terminal (UT) that is customized to access capabilities of the UT and/or current position of the UT. The SDL can be employed by the UT to determine which network access points to camp on, handoff to, or the like. The network components can include a network database that maintains UT subscriber and related home Femto cell information, or a network operator's home location register (HLR). Alternatively, the information can be obtained over the air (OTA) from the UT or from a base station (BS) served by the UT.

In other aspects of the subject disclosure, network access point management can be managed by a Femto-capable UT and/or access points of the mobile network, to provide distributed access point management. An interface application maintained at a Femto cell can facilitate communication between the Femto cell and the Femto-capable UT. Upon initial power up and/or acquisition, a bootstrap process can be implemented to establish a connection between the Femto cell and Femto UT. The bootstrap process can be utilized by the Femto cell to provision the UT with an SDL that establishes the Femto cell as a high priority access point within a particular geographic area (GEO), or home GEO. Thus, when the Femto UT is within the home GEO, the UT is more likely to acquire, camp on and/or handoff to the Femto cell. When outside the home GEO, a mobile network can provision the Femto UT OTA with a custom SDL suited to a non home GEO region, which establishes non Femto cells as higher priority access points.

In some aspects of the subject disclosure, provided is a method of facilitating remote access to a mobile network. The method can comprise obtaining data identifying a UT and employing the data to determine access capabilities of the UT. Further, the method can comprise generating a custom system determination list (SDL) for the UT comprising a preferred access point determined at least in part on the access capabilities, the SDL facilitates selection of the preferred access point. In addition to the foregoing, the method can comprise allowing or denying network access to the UT.

In other aspects of the subject disclosure, provided is a Femto base station (BS) configured to facilitate remote access to a mobile network. The Femto BS can comprise a receiver that obtains data identifying a UT and a communication processor that employs the data to determine access capabilities of the UT. Additionally, the Femto BS can comprise an SDL provisioning module that generates a custom SDL for the UT comprising a preferred access point determined at least in part on the access capabilities, the SDL facilitates selection of the preferred access point. Furthermore, the Femto BS can comprise a CSG employed to allow or deny network access to the UT.

In yet other aspects, disclosed is an apparatus for facilitating remote access to a mobile network. The apparatus can comprise means for employing bootstrap parameters to initiate a bootstrap acquisition mode and means for obtaining access capabilities of the UT from UT ID data. Further, the apparatus can comprise means for generating a custom SDL for the UT comprising a preferred access point determined at least in part on the access capabilities, the SDL facilitates selection of the preferred access point. Moreover, the apparatus can comprise means for allowing or denying network access to the UT.

According to one or more further aspects, disclosed is a processor configured to facilitate remote access to a mobile network. The processor can comprise a first module that obtains data identifying a UT and a second module that employs the data to determine access capabilities of the UT. Additionally, the processor can comprise a third module that generates a custom SDL for the UT comprising a preferred access point determined at least in part on the access capabilities, the SDL facilitates selection of the preferred access point. In addition to the foregoing, the processor can comprise a fourth module that allows or denies network access to the UT.

In at least one additional aspect, disclosed is a computer program product comprising a computer-readable medium. The computer-readable medium can comprise a first set of codes for causing a computer to obtain data identifying a UT and a second set of codes for causing the computer to employ the data to determine access capabilities of the UT. In addition, the computer-readable medium can comprise a third set of codes for causing the computer to generate a custom SDL for the UT comprising a preferred access point determined at least in part on the access capabilities, the SDL facilitates selection of the preferred access point, and a fourth set of codes for causing the computer to allow or deny network access to the UT.

According to additional aspects of the subject disclosure, provided is a method of selective access to a mobile network. The method can comprise obtaining UT data from memory or user input and providing the UT data to a network access point. Further, the method can comprise obtaining a customized SDL specifying at least one preferred mobile network access point based on an access capability of the UT, the SDL facilitates identifying and initiating wireless communication with the preferred access point.

In additional aspects, provided is a UT configured for accessing a mobile network. The UT can comprise a processor that obtains UT data from memory or user input and a transmitter that provides the UT data to a network access point. Furthermore, the UT can comprise a base station re-selection module that obtains a customized SDL specifying at least one preferred mobile network access point based on an access capability of the UT, the SDL facilitates identifying and initiating wireless communication with the preferred access point.

In addition to the foregoing, disclosed is an apparatus configured for selective access to a mobile network. The apparatus can comprise means for obtaining a bootstrap SDL and means for coupling to an access point via a bootstrap channel specified in the bootstrap SDL. Additionally, the apparatus can comprise means for obtaining a customized SDL specifying at least one preferred mobile network access point based on an access capability of a UT, the SDL facilitates identifying and initiating wireless communication with the preferred access point.

According to one or more other aspects, disclosed is a processor configured for selective access to a mobile network. The processor can comprise a first module that obtains UT data from memory or user input and a second module that provides the UT data to a network access point. Moreover, the processor can comprise a third module that obtains a customized SDL specifying at least one preferred mobile network access point based on an access capability of the UT, the SDL facilitates identifying and initiating wireless communication with the preferred access point.

In at least one additional aspect, disclosed is a computer program product comprising a computer-readable medium. The computer-readable medium can comprise a first set of codes for causing a computer to obtain UT data from memory or user input and a second set of codes for causing the computer to provide the UT data to a network access point. Furthermore, the computer-readable medium can comprise a third set of codes for causing the computer to obtain a customized SDL specifying at least one preferred mobile network access point based on an access capability of the UT, the SDL facilitates identifying and initiating wireless communication with the preferred access point.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
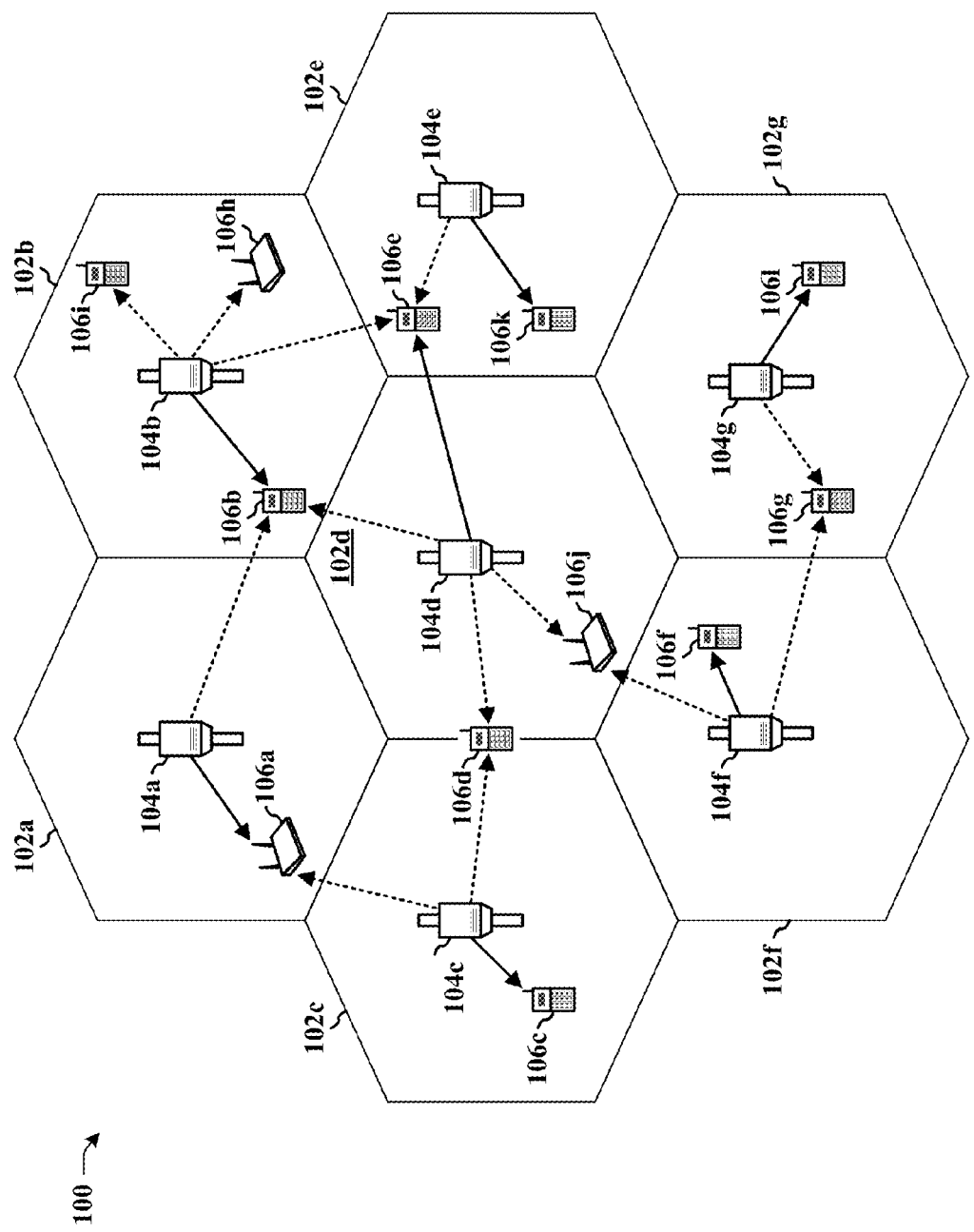
FIG. 1 illustrates a block diagram of an example wireless communication environment according to aspects of the subject disclosure.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of implementing improved network access in a mobile environment comprising disparate types of access points. One skilled in the art should appreciate that similar techniques could apply to other communication environments.

Development of wireless access points to communication networks have been one solution offered to effect convergence between traditional wireless communication systems and traditional fixed-line communication systems. The convergence, otherwise known as fixed-wireless convergence, involves a degree of interoperability between fixed line networks (e.g., intranet, Internet, etc.) and mobile communication networks (e.g., cellular phone networks). Base stations (BSs) provide wireless access to a mobile communication operator's network, such as a circuit-switched voice network (e.g., a code division multiple access [CDMA] 1-X, or CDMA 1X, network), a combined circuit-switched and packet-switched voice and data network (e.g., an CDMA evolution data optimized [EV-DO] network), or all-packet voice and data network (e.g., long term evolution [LTE] network), or the like. Examples of an access point BS (referred herein in the alternative as a BS) include a Node B (NB), base transceiver station (BTS) a home Node B (HNB), or simply a BS, of various transmit power/cell size including macro cells, micro cells, pico cells, Femto cells, etc.

The introduction of various types of access point BSs into traditional macro BS networks enables significant flexibility and consumer control over personal access to such networks. Users can often configure terminal devices to select a nearby access point BS or a macro network BS, depending on which provides a better signal. In addition, access point BSs can provide preferable rate plans compared with the macro network, at least in some circumstances, enabling users to reduce usage charges.

However, because typical macro networks are often deployed with large-scale public usage as the primary market, indoor reception can often be poorer than outdoor reception (e.g., due to absorption of radio frequency signals by buildings, insulation, ground landscaping, etc.), rendering a mobile device less effective than a fixed-line computer in such an environment. Access point BSs can provide significant improvement in this environment, however. As one example, Femto cell technology provides a user with significant control over personal wireless connectivity, indoors and outdoors, often obviating most or all such connectivity problems. Femto BSs, therefore, can further extend UT mobility even in a sub-optimal environment for macro networks.

Despite the significant advantages of Femto BSs and other access point deployments, some problems have resulted due to added complexity in coupling Femto BSs with an operator's macro networks. For instance, access point deployment, especially in the case of Femto cells, is typically un-planned or semi-planned, meaning that these BSs are installed outside of the control of the network operator. Thus, the operator has limited capacity to implement ideal placement of these access points relative other such access points or relative macro BSs. Furthermore, spatial shaping of wireless signals relative other Femto cells, or even precise knowledge of position location of such cells can be severely limited. In addition, where Femto BS deployment is open to consumer purchase and installation, a very dense installation of such cells can occur in high population urban or commercial areas, leading to wireless resource competition among nearby Femto and macro cells. Moreover, Femto BSs can be associated with a closed subscriber group (CSG) and provide network access only to members of the CSG; access in such case is not provided to the general cellular public, for instance. Thus, a Femto deployment amid a macro network integrates restricted access (RA) BSs with general access (GA) BSs.

Many legacy UTs are not equipped to distinguish GA and RA BSs, especially if such BSs both utilize cellular frequencies, and therefore can spend significant power searching for and attempting to access RA BSs that deny service to a UT. Additionally, legacy terminals and legacy wireless networking standards require mobile terminals to scan incoming wireless signals to identify optimal signals. Where there are only a few nearby BSs that the terminal can distinguish, this is typically a workable process. However, in dense access point deployments, dozens or hundreds of access points can exist in close proximity (e.g., within a large urban apartment building). If a UT's home access point, having a CSG that includes the UT, is within the dense deployment, distinguishing the home access point from hundreds or thousands of closely positioned foreign access points can be a significant problem. For instance, the UT is likely to utilize significant power camping on (analyzing pilot and control channels) or signaling foreign access points that will deny network access to the UT.

Where the UT is not in a region that includes a home access point, (or, e.g., where the UT does not have an active subscription with a Femto BS) the problem becomes distinguishing RA BSs from general access (GA) BSs, and ignoring the RA BSs. Additionally, although Femto BSs can be deployed on separate frequencies as the macro network, in some circumstances Femto cells and macro cells share one or more network frequencies, and thus are not so easily distinguished. Thus, a need exists for distinguishing Femto BSs from macro network BSs. In addition, it can be beneficial to limit UT signaling to RA BSs when a home BS is not likely to be found. Furthermore, it can be beneficial to increase a likelihood of signaling or searching for RA BSs where the home BS is expected to be found, and to mitigate redundant signaling to foreign Femto BSs. Aspects of the subject disclosure can provide improvement to many of the foregoing problems.

To address some of the foregoing and similar problems, the subject disclosure provides for mobile network parameterization for user terminal access to a mixed macro and Femto cell access network. The parameterization can be utilized to direct UTs to one or another type of cell, frequency channel, or the like, to improve a likelihood that the UE will discover a preferred cell, where applicable, or ignore non-preferred cells. In some implementations, a Femto system identifier (SID), separate from macro network SIDs, is reserved for all Femto cells. Thus, a Femto cell transmitting the Femto SID can be distinguished from macro BSs by a receiving terminal. In addition, a distinct network ID or node ID (NID) is assigned to each Femto cell of the Femto network. In some aspects, for instance where NID re-use is required, a cell ID can further be assigned to each Femto cell, which can optionally comprise the NID modified based on additional data, such as a subscriber's physical address, a mobile station identifier (MSI) or international MSI (IMSI), or the like. Thus, by including the SID/NID/cell ID in a transmitted signal, a Femto BS can be distinguished from macro BSs, and distinguished from other Femto BSs.

Thus, for instance, the above-mentioned parameterization can be employed to direct Femto cell capable UTs towards a nearby Femto cell or toward frequency channels employed by Femto cells based on the Femto SID/NID and optionally the cell ID. The parameterization can identify a home Femto cell(s) as a preferred or high priority network access point. If the Femto UE detects a wireless signal transmitted by the home Femto cell, the preferred or high priority status can cause the Femto UT to acquire such cell, or handoff to such cell if already camping on another network cell. If the Femto UT is not currently camped on the home Femto cell, the UT can periodically search for nearby cells to discover the preferred Femto cell.

In some aspects of the disclosure, a second parameterization can be provided to non-Femto capable UTs, or macro UTs, directing such terminals away from Femto cells, or toward a macro cell, or both. If Femto cells share a common frequency channel or carrier with macro cells, the parameterization can establish macro cells as preferred or high priority cells relative to Femto cells. Such relative priority can cause a macro UT to select a macro cell over a Femto cell, or cause the macro UT to periodically search for macro cells when camped on a Femto cell. If Femto cells and macro cells are deployed on separate frequency channels, the parameterization can exclude Femto cell data, causing the macro UT to ignore signals initiated by Femto cells. In at least some aspects of the subject disclosure, the parameterization can comprise a system determination list (SDL—see below) (e.g., a preferred roaming list) establishing the cell priorities, optionally as a function of a particular geographic region or access/registration region of a network. Accordingly, macro UTs and Femto capable UTs can be selectively provisioned to increase a likelihood that a particular type of cell is acquired, optionally depending on where the UT is located (see below).

According to still other aspects, directing a UT toward or away from a particular type of cell can be implemented based on a geographic area (GEO) in which the UT is currently located. For instance, if a Femto-capable UT is within a GEO in which a home Femto cell is positioned, the network parameterization (e.g., an SDL) directing the Femto UT to prefer Femto cells can be provided. Alternatively, or in addition, the parameterization can specify cell priority as a function of current GEO. Thus, within a home GEO(s), the parameterization can specify the Femto cell as a higher relative priority cell as compared with other cells, such as the macro cell. On the other hand, Femto cells can be given lowest priority when the Femto UT is in a non home GEO. In such a manner, the parameterization set would not need to be updated by the network as the UT travels from GEO to GEO. In either case, relative cell priority can be established as a function of whether the Femto UT can expect to find a home Femto cell, based on a current GEO the Femto UT is located in.

Provisioning a UT with an appropriate parameterization, based on UT capabilities and/or UT position, can be implemented in various suitable manners. In at least one aspect, a Femto database can be maintained at a mobile network, comprising UT-specific information. When a UT attempts to register on a cell, information identifying the UT can be provided to the network. The network can then determine whether the UT is attempting to register on a macro cell or Femto cell, and in the latter case whether the Femto cell is a home cell, on which the UT is authorized to access the mobile network, or an alien cell, on which the UT is not authorized such access. If the UT is registering on a macro cell, a parameterization can be sent over the air (OTA) to the UT (e.g., from the macro cell or a nearby Femto cell) increasing a likelihood that the UT will search for and acquire a Femto cell, optionally conditioned on the UT being within a home GEO. If the UT is registering on an alien Femto cell, a different set of parameters can be provided to the UT, directing the UT to search for other Femto cells, search on other frequencies, search for macro cells, or a combination thereof. If the UT is registering on the home Femto cell, a third parameterization can be provided to the UT, increasing a likelihood that the UT will remain on the home Femto cell (e.g., by creating a high threshold above which the UT searches for or hands off to other cells).

According to further aspects, parameterization can be implemented dynamically based on UT information when the UT registers on a cell. In such aspects, UT-specific information can be provided to the mobile network, which can generate or update a customized system determination list (SDL) for the UT (e.g., a preferring roaming list [PRL], or the like). The customized SDL can include appropriate parameterization for the UT, depending on whether the UT is Femto-capable, and optionally depending on what GEO the UT is currently located in. UT specific information, current GEO information and home GEO information, with which to dynamically configure the SDL, can be obtained in various suitable manners. In at least one aspect, the UT information and home GEO can be obtained from an operator's directory (e.g., a home location register [HLR] or like device) maintained by the UT's mobile operator. In other aspects, the UT can store such information and provide the information with the registration request. In yet other aspects, a user can input the information (e.g., by dialing a service number and including UT-specific information) manually onto the UT, which can be uploaded with the registration or sent on an uplink channel to the mobile network. Once the network receives the UT-specific information, the dynamic SDL can be generated and sent to the UT OTA.

As an alternative to the foregoing, a bootstrap procedure can be utilized to generate a specialized bootstrap SDL when a Femto UT pairs with, or establishes an initial configuration with, a home Femto cell. The Femto cell can generate a bootstrap SDL and a Femto SDL when it powers up and connects to a mobile network. The bootstrap SDL can specify an identity of the Femto cell, as well as a bootstrap cell ID and/or bootstrap frequency channel utilized for provisioning the SDL to the Femto UT. The Femto SDL, on the other hand, can specify typical system, network and frequency channels utilized in ordinary Femto cell-UT communication. When the Femto UT is paired with the Femto cell, the bootstrap and Femto SDLs can be sent OTA to the Femto UT. The Femto UT can utilize the bootstrap SDL when first powering up, or when switching from a different mobile system (e.g., switching between third generation partnership project [3GPP] systems and third 3GPP2 systems) to acquire the Femto cell. Once acquired, the Femto cell can update the Femto SDL at the Femto UT, if necessary. The Femto UT can then utilize the Femto SDL to acquire the Femto cell, search for other cells, handoff to other cells, or handoff to the Femto cell, or a combination thereof.

According to still other aspects, an application interface can be established on the Femto cell, which allows the Femto cell to communicate with any suitable Femto UT. Such communication can be established to determine whether the Femto UT is included within a closed subscriber group (CSG) associated with the Femto cell, and thus authorized to register on the Femto cell. Additionally, such an interface can be utilized to provision guest Femto UTs to temporarily access and register on the Femto cell. Upon establishing a connection to the Femto cell over the application interface, a Femto UT can analyze received signals, including macro cell signals and other nearby Femto cell signals, and provide information pertaining to the surrounding network to the Femto cell. The Femto cell can then generate a dynamic SDL that includes optimal cell selection parameters based on the surrounding network information. For instance, the dynamic SDL can set a relative priority for the macro network and the Femto cell. Alternatively, or in addition, the dynamic SDL can establish nearby Femto cells as preferred or un-preferred cells; the latter being blacklisted by the dynamic SDL. The dynamic SDL can be provided to the Femto UT, which can utilize the SDL in cell selection and handoff procedures. By employing the surrounding network information, the dynamic cell need not generate an exhaustive list of alien Femto cells which to blacklist. Instead, only those Femto cells nearby enough (e.g., having strong enough pilot signals) to interfere with the provisioning Femto cell can be blacklisted, enabling a relatively small sized dynamic SDL. Further to the above, if changes to the surrounding network occur, the Femto cell can update the dynamic SDL and push the updated SDL to a Femto UT OTA via the application interface. Accordingly, the Femto UT can be provisioned with updated network information to optimize search and acquisition functions in an evolving network deployment.

The techniques described herein can be used for various wireless communication systems such as code division multiple access (CDMA), time division multiple access (TDMA), frequency division multiple access (FDMA), orthogonal FDMA (OFDMA), SC-FDMA (single carrier FDMA) and other systems. The terms "system" and "network" are often used interchangeably. A CDMA system can implement a radio technology such as Universal Terrestrial Radio Access (UTRA), CMDA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). LTE (long term evolution) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process and/or thread of execution and a module can be localized on one electronic device and/or distributed between two or more electronic devices. Further, these modules can execute from various computer-readable media having various data structures stored thereon. The modules can communicate by way of local and/or remote processes such as in accordance with a signal having one or more data packets (e.g., data from one component interacting with another component in a local system, distributed system, and/or across a network such as the Internet with other systems by way of the signal). Additionally, components or modules of systems described herein can be rearranged and/or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user terminal—UT. A UT can also be called a system, a subscriber unit, a subscriber station, mobile station, mobile, mobile communication device, mobile device, remote station, remote terminal, access terminal (AT), user agent (UA), a user device, or user equipment (UE), or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media comprises computer-readable hardware, which includes computer storage media and hardware communication media, and communication media including any software, middleware, firmware, microcode and/or hardware medium that facilitates transfer of a computer program from one place to another.

As utilized herein, a computer storage media can be any physical media that can be accessed by a computer. By way of example, and not limitation, such storage media can comprise RAM, ROM, EEPROM, CD-ROM or other optical disk storage, magnetic disk storage or other magnetic storage devices, smart cards, and flash memory devices (e.g., card, stick, key drive . . . ), or any other suitable medium that can be used to carry or store program code in the form of instructions or data structures and that can be accessed by a computer. Hardware communication media can include any suitable device or data connection that facilitates transfer of a computer program from one entity to another at least in part utilizing electrical, mechanical and/or electromechanical hardware. In general, a data connection is also properly termed a computer-readable medium. For example, if a program, software or other data is transmitted from a website, server, or other remote source using a coaxial cable, fiber optic cable, twisted pair, digital subscriber line (DSL), communication bus structure, Ethernet, or wireless technologies such as infrared, radio, and microwave, then the coaxial cable, fiber optic cable, twisted pair, DSL, or wireless technologies such as infrared, radio, and microwave are included in the definition of medium, and any suitable hardware components associated with such medium are included in the definition of hardware communication media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a device-readable medium, machine-readable medium and/or computer-readable medium, which can be incorporated into a computer program product. The term "article of manufacture" as used herein is intended to encompass a computer program accessible from any computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to the drawings, FIG. 1 illustrates an exemplary wireless communication system 100 configured to support a number of users, in which various disclosed embodiments and aspects can be implemented. As shown in FIG. 1, system 100 provides communication for multiple cells, such as macro cells 102a, 102b, 102c, 102d, 102e, 102f, 102g (alternatively, macro cells 102a-102g), with each cell being serviced by a corresponding access point (AP) 104a, 104b, 104c, 104d, 104e, 104f, 104g (alternatively, APs 104a-104g). Each cell 102a-102g can be further divided into one or more sectors. Various UTs 106a, 106b, 106c, 106d, 106e, 106f, 106g, 106h, 106i, 106j, 106k (alternatively, UTs 106a-106k) are dispersed throughout system 100. Each AT 106a-106k can communicate with one or more APs 104a-104g on a forward link (FL) and/or reverse link (RL) at a given moment, depending on whether an AT (106a-106k) is active or whether it is in soft handoff, for example. The wireless communication system 100 can provide service over a large geographic area; for example, macro cells 102a-102g can cover a few blocks of a neighborhood.

Figure 2:
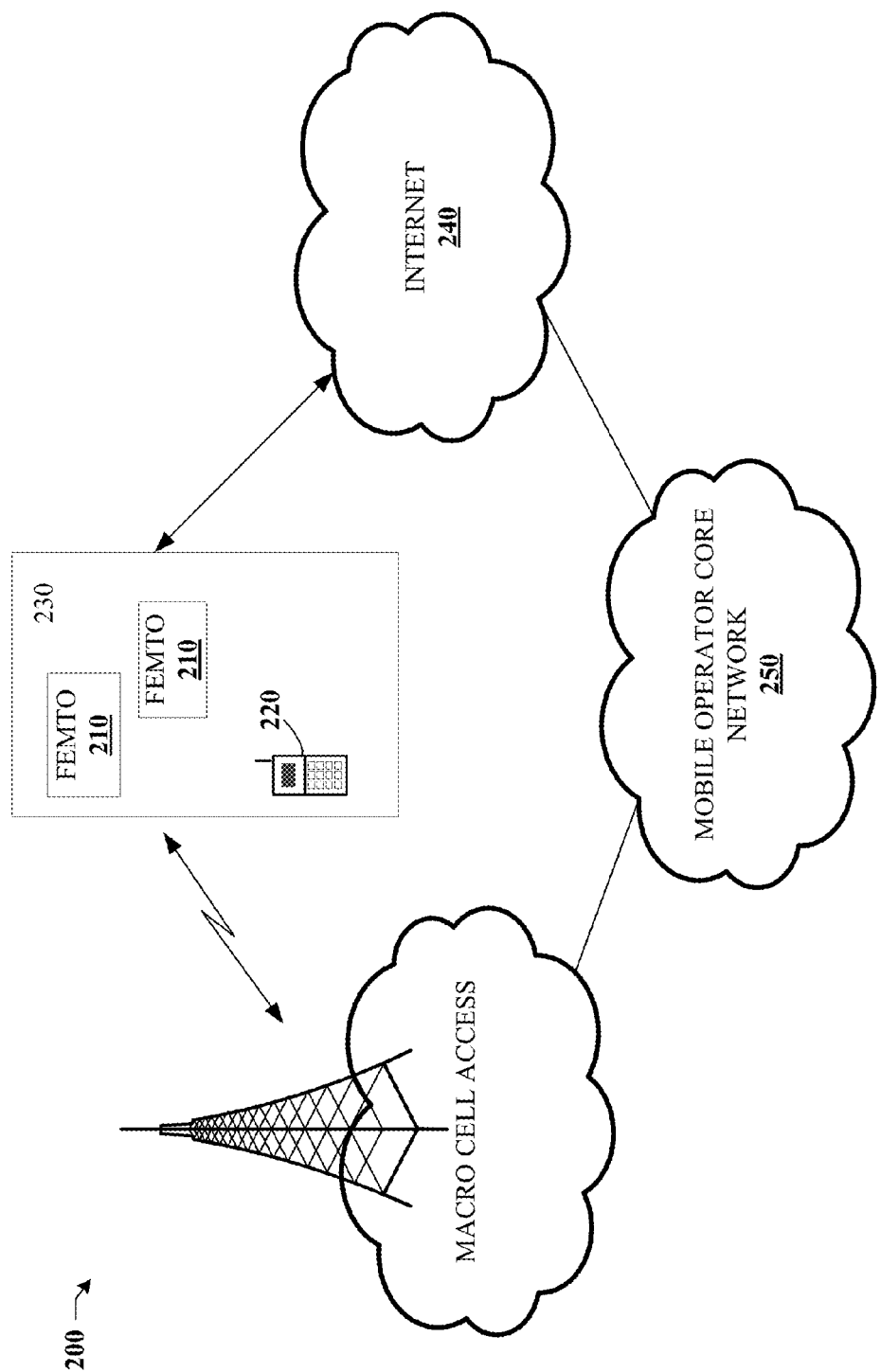
FIG. 2 illustrates a block diagram of a sample wireless network comprising Femto cell base stations (BSs) according to other aspects.

FIG. 2 depicts an exemplary communication system 200 to enable deployment of BSs (e.g., macro BS, Femto BS) within a network environment. System 200 includes multiple BSs including Femto BSs 210, each of which are installed in corresponding small scale network environments. Examples of small scale network environments can include user residences, places of business, indoor/outdoor facilities 230, and so forth. The Femto BSs 210 can be configured to serve associated UTs 220 (e.g., included in a CSG associated with Femto BSs 210), or optionally alien or visitor UTs 220 (e.g., that are not configured for the CSG of the Femto BS 210). Each Femto BS 210 is further coupled to the Internet 240 and a mobile operator core network 250 via a DSL router (not shown), or, alternatively, a cable modem, broadband over power line connection, satellite Internet connection, or a like broadband Internet connection (not shown).

To implement wireless services via Femto BSs 210, an owner of the Femto BSs 210 subscribes to mobile service, such as 3G mobile services, offered through the mobile operator core network 250. Also, the UT 220 can be capable to operate in a macro cellular environment and/or in a residential small scale network environment, utilizing various techniques described herein. Thus, at least in some disclosed aspects, Femto BS 210 can be backward compatible with any suitable existing UT 220. Furthermore, in addition to the macro cell mobile network 250, UT 220 can be served by a predetermined number of Femto BSs 210, specifically Femto BSs 210 that reside within a corresponding user residence(s), place(s) of business, or indoor/outdoor facilities 230, and cannot be in a soft handover state with the macro network 250. It should be appreciated that although aspects described herein employ 3GPP terminology, it is to be understood that the aspects can also be applied to 3GPP technology (Release 99 [Rel99], Rel5, Rel6, Rel7), as well as 3GPP2 technology (1xRTT, 1xEV-DO Rel0, RevA, RevB) and other known and related technologies.

Figure 3:
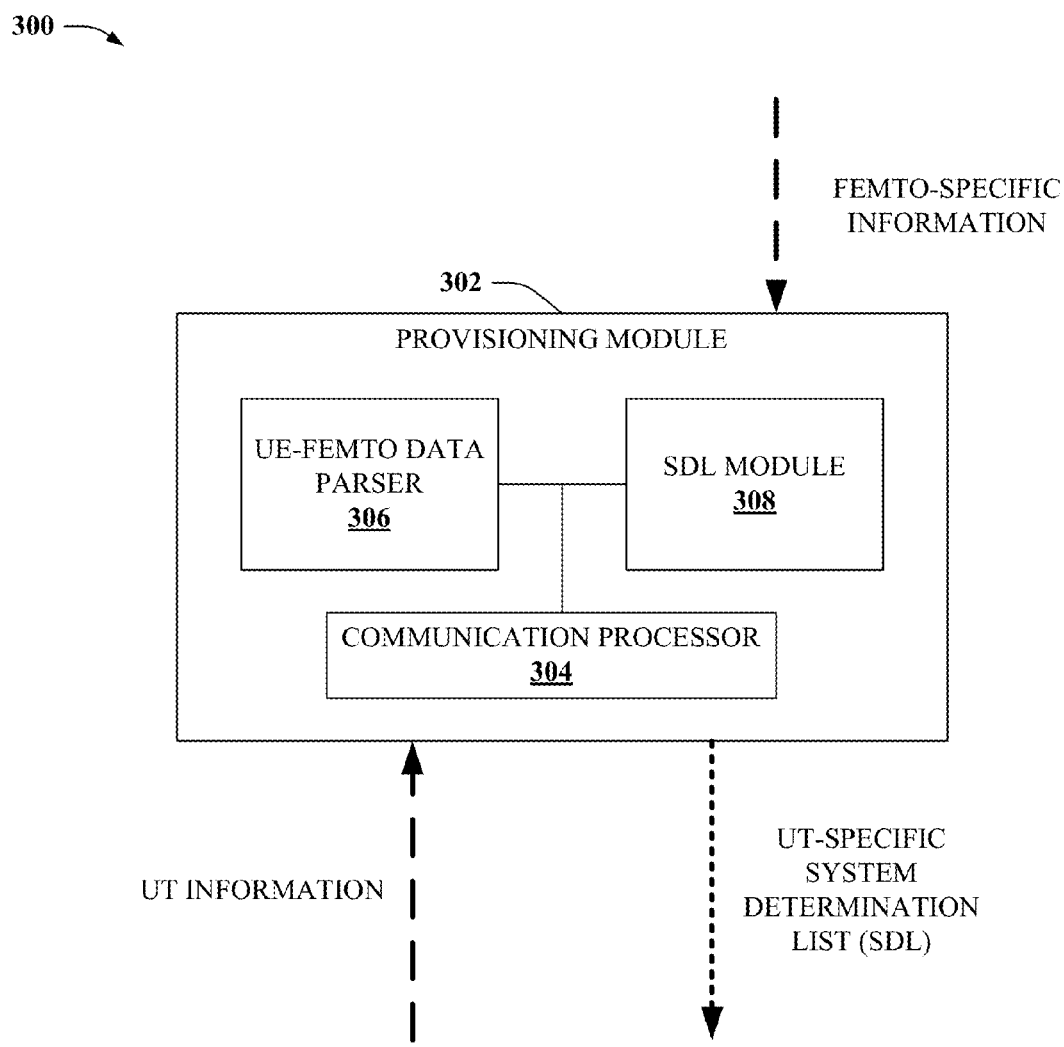
FIG. 3 depicts a block diagram of a sample system for provisioning a user terminal (UT) with a system determination list (SDL) for Femto cell acquisition.

FIG. 3 illustrates a block diagram of an example system 300 providing centralized access point management in a mobile communications environment. A suitable mobile environment can include GA macro access points (e.g., macro cells, micro cells, pico cells, or even Femto cells set to GA in some circumstances), as well as RA Femto access points having a limited CSG. Because system 300 is centralized, access point management can be provided for UTs served by multiple BSs, or all UTs served by a network of BSs. As illustrative examples, if system 300 is located at a base station controller (BSC) managing several BSs for a base station subsystem (BSS), access point management can be provided by system 300 for each BS of the BSS. Likewise, if system 300 is located at a mobile switching center (MSC) or a serving GPRS support node (SGSN) for a system employing GPRS (general packet radio system), access management can be provided for all BSs served by the MSC and/or SGSN. Alternatively, or in addition, system 300 can be located within an operator's core network, enabling the access point management to be managed centrally at the core network for all BSs coupled to the core network. In some cases, system 300 can be deployed at a centralized network of Femto cells, on an Internet server, or within the operator's core network (e.g., at an Internet gateway of such network) to facilitate access management for each of the Femto cells.

System 300 comprises a provisioning module 302 that facilitates access point selection for UTs coupled with a mobile network. Provisioning module 302 can generate a system determination list (SDL) (e.g., see FIG. 8, infra) that can be utilized by a UT to select among multiple available access points to the mobile network. Additionally, the provisioning module 302 can be customized to the UT, based at least on Femto capabilities of the UT. Thus, for instance, a first type of SDL can be customized for a non Femto capable UT and a second type of SDL can be customized for a Femto capable UT. Additionally, the second type can be individualized for each Femto capable UT, to identify Femto cells permitting network access to the particular Femto UT, for instance.

To customize an SDL, provisioning module 302 can include an SDL module 308 that obtains UE-specific and Femto cell specific data from a UE-Femto data parser 306. A communication processor 304 can couple with various external sources to obtain the information. For instance, provisioning module 302 can employ the communication processor 304 to couple with a particular Femto cell (e.g., via an Internet gateway that communicates with the Femto cell via the Internet) to obtain Femto cell data or data pertaining to a UT coupled with the Femto cell (e.g., an MSI, IMSI, electronic serial number [ESN], or like unique ID of the UT). Alternatively, or in addition, the communication processor 304 can employ a macro network (not depicted) to couple with the Femto UT to obtain such information. In other aspects, the communication processor can couple with a Femto database (e.g., see FIG. 4, infra) or an operator's home location register (HLR), where such register stores Femto-UT data.

Data obtained by the communication processor 304 is provided to UE-Femto parser 306 to extract pertinent information. Such information can include an SID of a serving BS (e.g., a Femto SID reserved for Femto cells, a macro SID) as well as a subset of NIDs and/or cell IDs of cells associated with the SID. Furthermore, extracted information can comprise ID information of a UT attempting to register on a mobile network. SDL Module 308 can generate a default SDL (e.g., a PRL) for UTs coupled with a macro BS, UTs that are not Femto capable (determined at least in part from the UT data), or UTs not in a home GEO. The default SDL can contain a list of macro SID/NIDs (or other node IDs, such as a subnetID in an EV-DO system) that the UT can connect to. In some aspects, the SDL can establish one or more SID/NIDs as preferred IDs, as discussed in more detail below.

For a custom SDL, the SDL module 308 can provision an SDL with information pertinent to a particular UT or cell serving the UT. Thus, for instance, an SID reserved for Femto BSs can be included in the custom SDL, if the particular UT is a Femto-capable UT. By employing such a custom SDL, UTs can identify signals that include the reserved SID as originating from a Femto cell. Furthermore, the custom SDL can include a subset of NID and/or cell IDs associated with the Femto SID. Thus, the UT can ignore signals not including the subset of NID/cell IDs, or simply analyze signals that include the subset of NID/cell IDs in conjunction with signals that include a different SID (e.g., a macro SID). In some aspects, the subset of NIDs/cell IDs can include one or more NIDs/cell IDs of home Femto cells associated with a registering Femto UT.

According to some aspects of the subject disclosure, SDL module 308 can establish one or more system and/or network IDs as preferred, one or more other system and/or network IDs as non-preferred, indicate no special preference for a system and/or network ID, or a combination thereof. Thus, a UT can select among one or more signals based on signal strength and/or quality, as well as SID/NID preference status. Where a UT is provided a custom SDL with a preferred SID/NID(s), the UT can continue searching for the preferred SID/NID even when currently coupled to a non-preferred cell or cell having no preference status. Additionally, if the UT acquires the preferred SID/NID, a high threshold can be established, above which the UT will search for other BSs. Thus, as a particular example, the UT can ignore neighboring cells when coupled to the preferred cell, unless a signal strength of the preferred cell drops below a relatively low threshold, or a signal strength disparity between the preferred cell and a neighboring cell rises above a relatively large threshold, which favors the neighboring cell.

According to still other aspects, an SDL can be configured according to one or more GEOs. Thus, available SID/NIDs within a GEO in which a cell obtaining a registration request resides can be included in the SDL. In some aspects, the SDL can further include neighboring GEOs and associated SID/NIDs, in case a UT travels outside the current GEO. For an SDL customized for a Femto UT, the current GEO can contain macro BS SID/NIDs, and one or more Femto SID/NIDs if the current GEO is a home GEO associated with the Femto UT. Additionally, the Femto SID/NIDs can be given preferred status, directing the UT to favor Femto cells over other types of network access points, as discussed above. If the current GEO is not the home GEO, then the SDL can be configured to contain no Femto SID/NIDs, enabling the Femto UT to ignore wasted signaling to alien Femto cells. Accordingly, the custom SDL can be utilized to preserve overhead signaling for the Femto UT, by listing Femto cell SID/NIDs as preferred when a home Femto cell can be expected to be found (e.g., in the home GEO or GEOs), and not including Femto cell SID/NIDs when the home Femto cell is not expected to be found (e.g., outside of the home GEOs).

Figure 4:
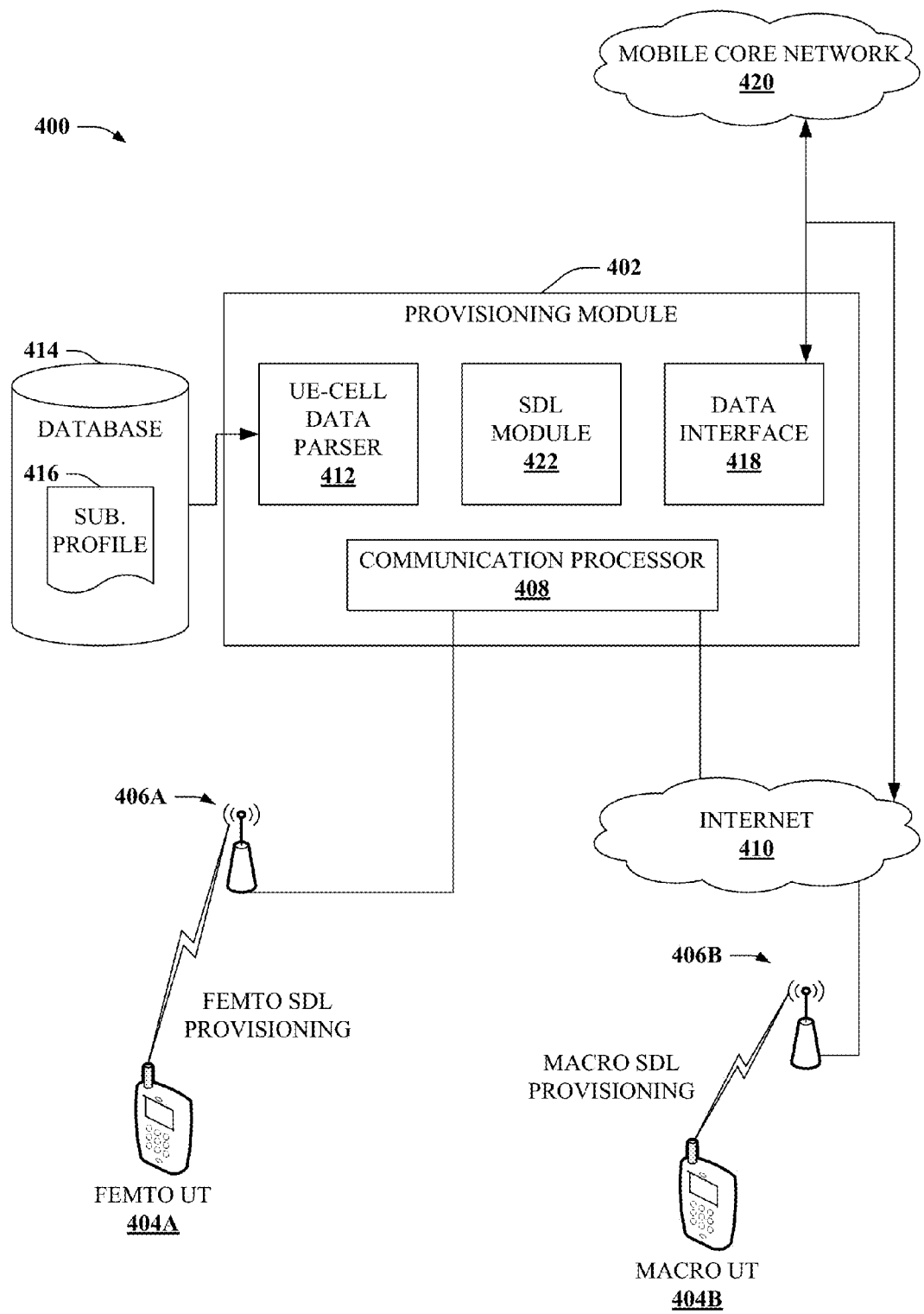
FIG. 4 illustrates a block diagram of an example system that facilitates selective BS acquisition based on capabilities of a UT.

FIG. 4 illustrates a block diagram of an example system 400 that provides access point management for UTs 404A, 404B of varying access capability. The system 400 can comprise a provisioning module 402 that generates an SDL for the UTs based on respective UT capabilities. The provisioning module 402 can receive a registration request at communication processor 408 from an access point, such as macro access point 406A or Femto access point 406B, that includes ID information of a registering UT 404A, 404B (e.g., MSI, IMSI, ESN, etc.). The ID information can be utilized to obtain subscriber information (416) at various network data stores. For instance, UE-Cell data parser 412 can access a network Femto database 414 if the registering UT is a Femto UT 404B. The Femto database 414 can store subscriber profiles 416 indicating what subscriber Femto UTs (404A) are permitted to access a particular Femto cell (406B), as well as what Femto cells (406B) are home cells for a particular subscriber's Femto UT (404A). Additionally, the database 414 can indicate an associated GEO for each Femto cell (406B) and home GEO(s) for each Femto UT (404A). Thus, utilizing the ID of the registering Femto UT 404A, provisioning module 402 can identify the Femto cells (406B) associated with such ID and GEOs of such cells. If the Femto UT 404A is in a home GEO, a custom SDL can be generated by SDL module 422 identifying the home Femto cell and establishing such cell as a preferred cell. Otherwise, the SDL can include macro cell SID/NIDs, directing the Femto UT to search for and/or remain coupled to macro cells.

Alternatively, or in addition to the foregoing, provisioning module 402 can comprise a data interface 418 that can couple to the Internet and/or a mobile core network 420. Thus, data interface 418 can communicate with a Femto cell 406B utilizing an Internet gateway (not depicted) utilized by such cell 406B. The data interface can be utilized to query the Femto cell 406B and obtain ID information of such cell and/or UTs (404B) coupled to the Femto cell 406B. In addition, the data interface can communicate with the macro core network 420 to obtain UT subscriber information. In some aspects, such information can include subscriber ID information. The subscriber ID information can be utilized to establish a particular GEO for the Femto cell 406B. As an example, a physical address (e.g., mailing address), zip code, and/or like information can be utilized to establish the Femto GEO. Thus, the Femto GEO can be a relatively small area surrounding the Femto cell 406B, limiting a number of other access points (406A) that are included in the Femto cell's GEO. If the registering UT is a Femto UT (404A) and a home GEO of the Femto UT (404A) is the same as the GEO of the Femto cell 406B, the Femto GEO, as well as SID/NID/cell ID of the Femto cell 406B can be included in a custom SDL by SDL module 422, which is provided to such UT. Otherwise, an SDL containing macro BS SID/NID/cell IDs can be generated and provided to the UT, causing the UT to ignore Femto cell signals and search for macro signals instead.

Figure 5:
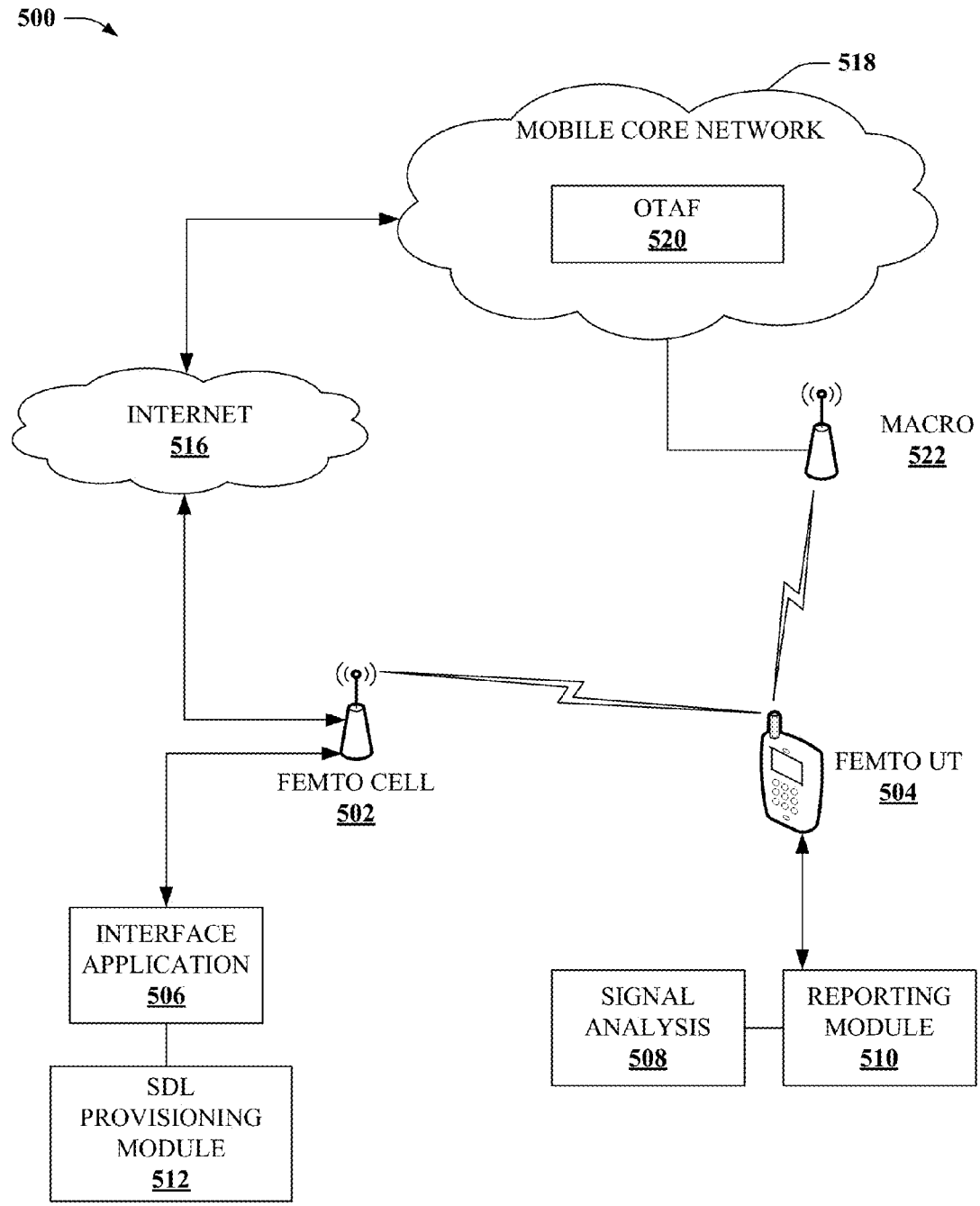
FIG. 5 depicts a block diagram of a sample system that employs distributed access point management for a UT.

FIG. 5 depicts a block diagram of an example system 500 that provides distributed access point management for a UT 504. As depicted, system 500 can comprise one or more Femto cells 502 and one or more UTs, including Femto UT 504. The Femto cell 502 can comprise an interface application 506 configured to provide wireless data exchange between the Femto UT 504 and a home Femto cell 502 associated with such UT 504. The interface application 506 can be utilized to generate a customized SDL specifically for the Femto UT 504, in a similar manner as described above, but from the home Femto cell 502 instead of a centralized network location. In addition, the interface application 506 can employ a frequency channel typically utilized by the Femto cell 502 for wireless communications, or can utilize a special provisioning or bootstrap channel for providing the custom SDL (e.g., see FIG. 6, supra).

Interface application 506 can be utilized by the home Femto cell 502 to perform self-configuration procedures with a macro core network 518 via a connection to the Internet. Thus, for instance, the Femto cell 502 can obtain information pertaining to neighboring cells (not depicted) of the Femto cell 502, including macro cells as well as other Femto cells. Additionally, the Femto cell 502 can obtain data indicating whether such other Femto cells are home Femto cells of the Femto UT 504, or alien Femto cells that provide limited or no access to the Femto UT 504.

Interface application 506 can comprise an SDL provisioning module 512 that can generate a custom SDL for the Femto UT 504. If the Femto UT 504 is included in a CSG associated with the Femto cell 502, the SDL can be provisioned to specify Femto cell 502, as well as any neighboring home Femto cells, as a preferred cell, nearby macro cells as lower priority, and nearby alien Femto cells as non-preferred. If the Femto UT 504 is not included in the CSG, the Femto cell 502 can check a guest subscriber group (GSG), to determine whether Femto UT 504 should be provided guest access. Guest access can be comprise full access (the same as for home Femto cells), or limited access, which limits bandwidth, mobile resources and/or an amount of time that the guest UT can utilize the Femto cell 502. For a guest SDL, the Femto cell 502 can be established as a preferred cell, and neighboring cells (macro or Femto) as lower priority cells. Optionally, the guest SDL can provide no special preference for the Femto cell 502 and neighboring cells, allowing the guest UT to acquire and access neighboring cells based on signal strength.

In some aspects of the subject disclosure, Femto UT 504 can employ the interface application 506 to provide an SDL to Femto cell 502. Thus, for instance, a default SDL obtained from the mobile core network 518 via an over the air provisioning function (OTAF) 520 and a macro BS 522 can be forwarded to the interface application 506. The SDL provisioning module 512 can then modify the default SDL to generate the custom SDL, discussed above, including the SID/NID/cell ID of Femto cell 502 as a preferred cell, and specifying neighboring cells as non-preferred cells.

The Femto UT 504 and Femto cell 502 can utilize normal wireless communication (e.g., employing a typical operating channel of the Femto cell 502, as opposed to a bootstrap or provisioning channel for instance) once the custom SDL is generated and provided to the Femto UT 504. Periodically, the Femto cell 502 and Femto UT 504 can engage the interface application 506 (optionally utilizing a special bootstrap frequency) to update SDL provisioning at SDL provisioning module 512. For instance, changes in neighboring cells/cell IDs can be added to an SDL utilized by the Femto UT 504 via periodic use of the interface application 506. Thus, system 500 can employ the interface application 506 and SDL provisioning module 512 to generate as well as update a customized SDL to reflect changing network conditions.

According to particular aspects of the subject disclosure, a customized SDL can reflect prevailing signal conditions near the Femto cell 502. In such aspects, Femto UT 504 can couple to the Femto cell 502 via interface application 506 for SDL provisioning. During such provisioning, Femto UT 504 can employ a signal analysis module 508 to monitor and analyze wireless signals of neighboring macro and Femto BSs (522). Signal strength, signal quality, and like statistics can be obtained utilizing the signal analysis module 508. Additionally, the signal analysis module 508 can identify SID/NID/cell ID information transmitted with each signal, to identify a BS (522) transmitting the signal. The information can be provided to the Femto cell 502 via a reporting module 510. In such case, SDL provisioning module 512 can identify neighboring cells (522) that result in potentially strong interference, or having strong enough signals to cause Femto UT 504 to attempt to acquire or switch to such signals. If Femto UT 504 is included in a CSG or GSG of Femto cell 502, SDL provisioning module 512 can blacklist neighboring alien Femto cells, to prevent the Femto UT 504 from seeking to acquire such cells. During SDL update provisioning, as discussed above, new alien Femto cells, determined by signal analysis module 508, can also be blacklisted as necessary. Accordingly, the custom SDL can be provisioned to blacklist only those neighboring cells likely to interfere with or cause Femto UT 504 to handoff to such cells, providing for a relatively small blacklist as opposed to blacklisting all Femto cells sharing a common GEO with Femto cell 502.

Figure 6:
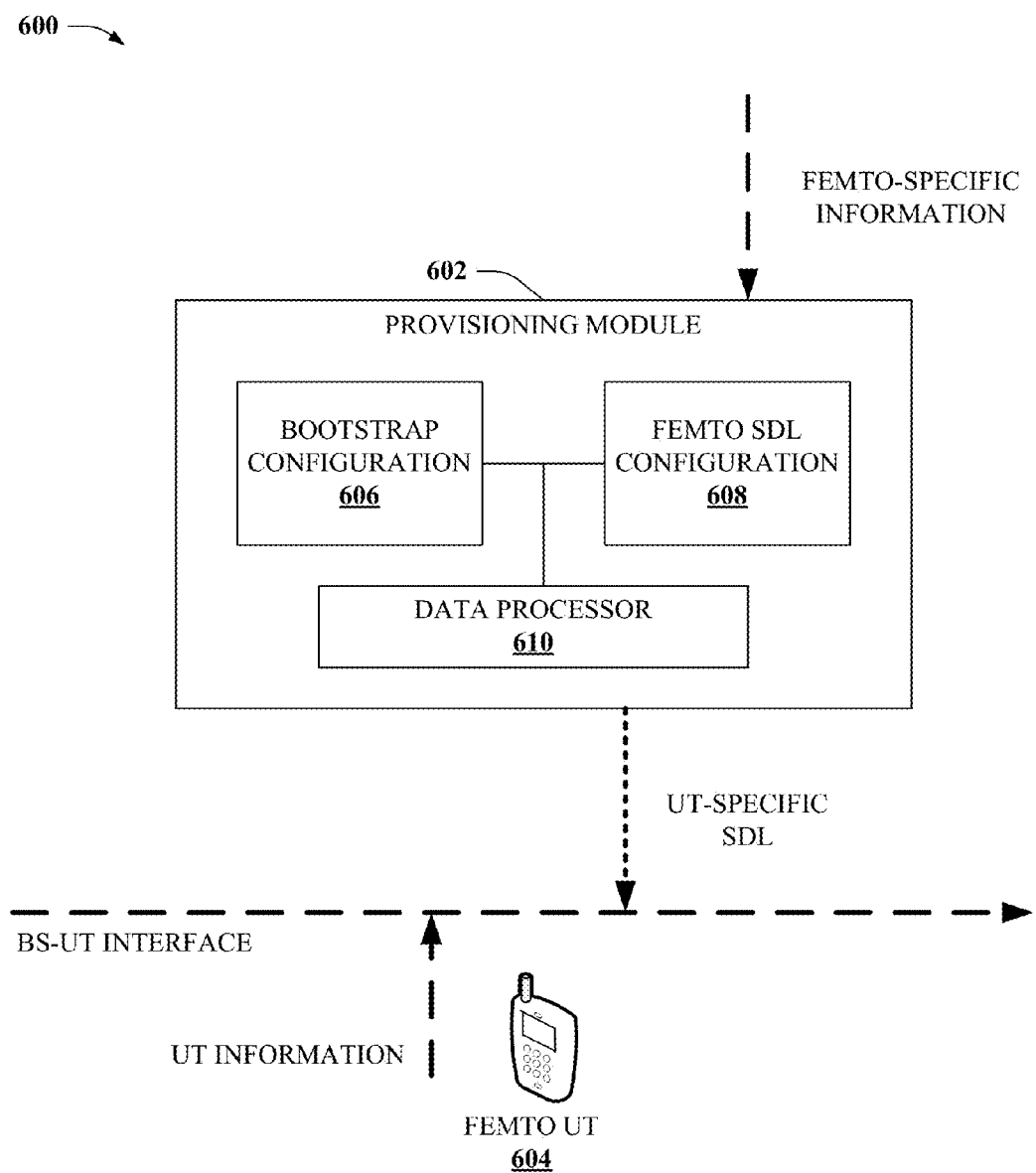
FIG. 6 illustrates a block diagram of an example system that utilizes a bootstrap configuration to provision a UT according to some aspects disclosed herein.

FIG. 6 depicts a block diagram of an example system 600 that facilitates initial start-up provisioning for terminal devices coupling to a mobile network. System 600 comprises a provisioning module 602 coupled to a Femto UT 604 via a BS-UT interface. Such an interface can comprise a wireless transceiver of a Femto cell device (not depicted) coupled to the provisioning module and a wireless channel employed by such transceiver. The start-up provisioning can be utilized to generate a custom SDL for the Femto UT 604, as described herein, and provide the custom SDL for selecting and handing off to network BSs identified in the SDL.

Provisioning module 602 comprises a bootstrap configuration module 606 that establishes bootstrap provisioning for a Femto cell coupled to the provisioning module 602 and for the Femto UT 604. The bootstrap configuration module 606 can obtain Femto-specific information from a data processor 610 that can communicate with a mobile operator's network (e.g., via an Internet connection coupled with a Femto cell). The Femto information can comprise a SID reserved for use by Femto cells. In addition, the Femto information can comprise bootstrap and cellular information utilized by the Femto UT 604 for initial configurations and for cell signaling/acquisition and traffic resources, respectively. The bootstrap information can comprise the SID as well as a bootstrap NID, utilized on startup to identify a Femto cell, as well as a bootstrap frequency channel utilized to communicate with the Femto cell for startup provisioning. The bootstrap information, <SID, $NID_{bootstrap}$, $Channel_{bootstrap}$> can be included in a custom SDL provided to the Femto UT 604, either via a Femto cell coupled to the provisioning module 602 if communication is already established between such cell and Femto UT 604, or via macro network provisioning.

Once Femto UT 604 obtains the custom SDL comprising the bootstrap information, listed above, the UT 604 can perform initialization or pairing routines with a Femto cell utilizing the bootstrap NID and bootstrap channel. In some aspects, the bootstrap procedure is performed with the Femto cell radiating at very low power (e.g., a fraction of a watt), with the Femto UT 604 positioned close to the Femto cell (e.g., within 1 meter). The bootstrap channel can be utilized, in particular aspects, to bypass a CSG utilized by the Femto cell, since it can be assumed that at such close range the Femto UT 604 is operated by an owner of the Femto csell. Accordingly, in such aspects, the Femto UT 604 can be initially included in the Femto cell's CSG by utilizing the bootstrap operations provided by system 600.

After initial pairing with the Femto cell, provisioning module 602 can generate a custom SDL for mobile communications with the Femto cell. The bootstrap SDL can be provided by Femto UT 604 during initial acquisition to the Femto cell, which can forward such SDL to data processor 610. A Femto SDL configuration module 608 can modify the bootstrap SDL to include a Femto-specific SID/NID and channel for cellular communications with the Femto cell.

Such information can be represented as <$SID_{Femto}$, $NID_{Femto}$, $Channel_{Femto}$>, indicating a Femto-related SID/NID/Channel of operation. Subsequent interaction with between Femto UT 604 and the Femto cell can be conducted utilizing the Femto-related information, at normal Femto transmit powers/distances, where the UT 604 is vetted utilizing the CSG of the Femto cell. In some aspects, analysis of neighboring cells (e.g., as described supra at FIG. 5) can be conducted during the initial provisioning described above. Thus, the Femto information can also include blacklisted alien Femto cells having a threshold or larger signal strength/quality, which could result in the UT 604 acquiring or handing off to neighboring alien Femto cells over a configured home Femto cell. As described, system 600 can provide an efficient mechanism for distributed access point management employing initial Femto device paring routines.

Figure 7:
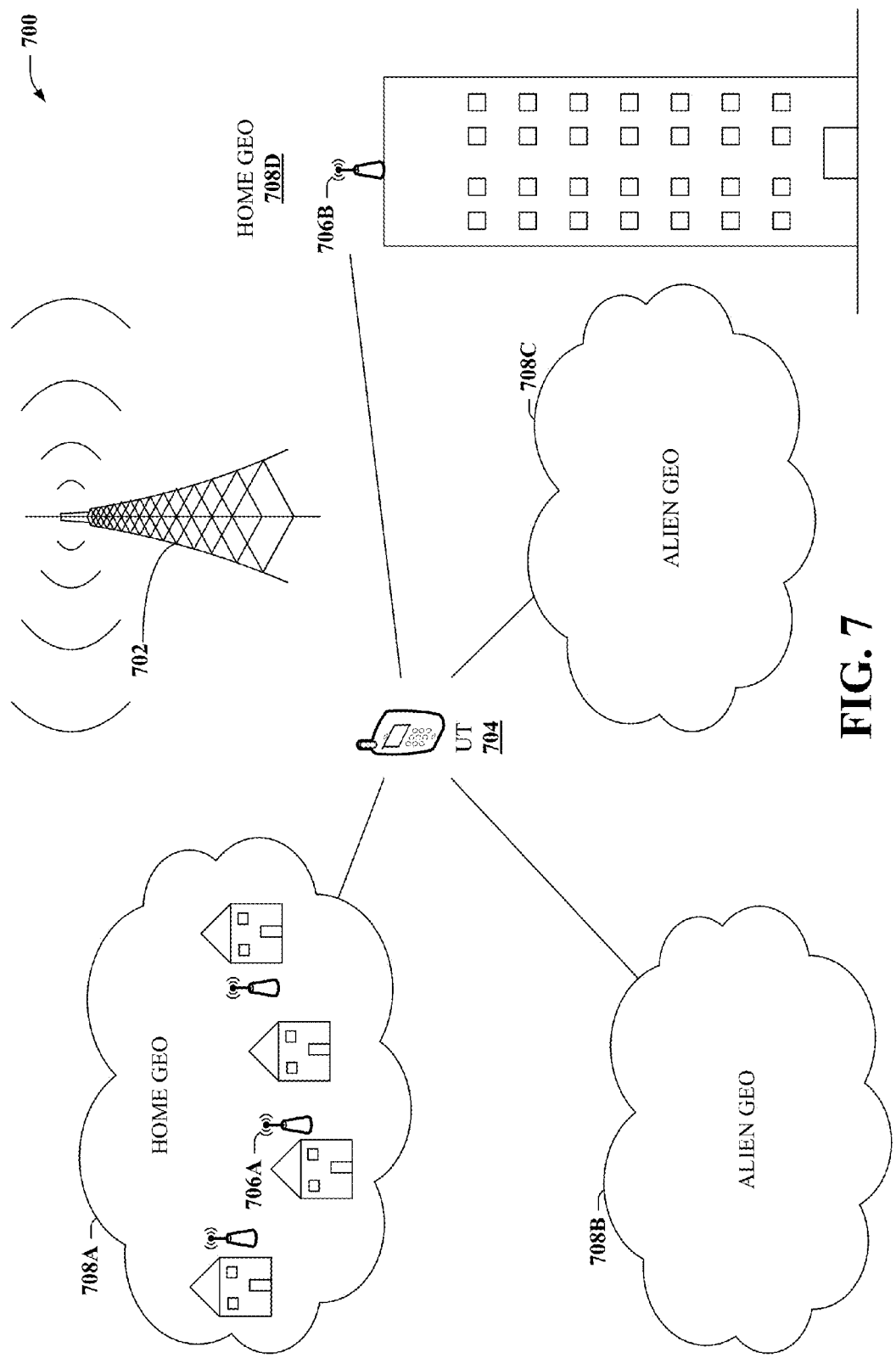
FIG. 7 depicts a block diagram of an example environment comprising various Femto cell networks interspersed in and macro access environment.

FIG. 7 illustrates a block diagram of an example integrated Femto-macro mobile environment 700 according to aspects of the subject disclosure. Mobile environment 700 comprises at least one macro BS 702 providing GA wireless services for a UT 704. Thus, the UT 704 can communicatively couple with the macro BS 702 in favorable macro wireless conditions, or where a preferred BS (706A, 706B) is not in sufficient range.

In addition, environment 700 comprises multiple GEOs 708A, 708B, 708C, 708D (or, 708A-708D) within the coverage of the macro BS 702. Such GEOs comprise at least two home GEOs 708A, 708D in which UT 704 is associated with at least one home Femto cell 706A, 706B. For instance, GEO 708A can comprise a residential area in which a subscriber has a home Femto cell 706A established at such subscriber's residence. Additionally, GEO 708D can comprise a commercial or industrial area in which the subscriber has a second home Femto cell 706B established at an office building or other place of business. Other GEOs 708B, 708C are alien GEOs, in which the subscriber has no home Femto cell (706A, 706B).

It should be appreciated that the GEOs 708A-708D depicted by environment 700 can be defined utilizing various criteria. In one example, the GEOs 708A-708D can be defined utilizing network regional information, such as a location area ID (LAI) or routing area ID (RAI) of the macro network (702). In other examples, the GEOs 708A-708D can be defined utilizing political/legal geographic boundaries, such as municipality boundaries, county boundaries, state boundaries, or the like. In yet other examples, the GEOs 708A-708D can be defined based on subscriber data associated with the home Femto cells 706A, 706B. Thus, for instance, a mailing address, zip code, or other position/area identifier (e.g., global positioning system) associated with the respective home Femto cells 706A, 706D can be employed to define at least the respective home GEOs 708A, 708D. In some aspects, a combination of the foregoing examples can be utilized in defining the GEOs 708A, 708D.

As UT 704 travels from GEO to GEO, it can report to a serving BS the identity of a GEO in which the UT 704 is currently located. The serving BS can forward the GEO to a mobile network to update current position location of the UT 704. Additionally, the current GEO can be utilized to generate a custom SDL for the UT 704, as described herein (e.g., where suitable BSs are given preference over other BSs, depending on the current type of GEO, home or alien). In a centralized access point management architecture, the network can generate and provide the custom SDL to UT 704, utilizing macro BS 702 or a Femto cell (706A, 706D) coupled with the UT 704. The network can utilize the current position/location information, for instance, to page the UT 704 and deliver such data, as is known in the art. In a distributed access point management architecture, a serving BS (702, 706A, 706B) can generate and provide the custom SDL to the UT 704, optionally upon start-up provisioning. In such case, a serving BS (702, 706A, 706D) can update the custom SDL, where necessary, when the UT 704 travels to a new GEO and first attempts to register on a BS within the new GEO. Accordingly, employing an SDL for access point management can be an adaptable mechanism that accommodates for UT mobility and for a dynamic network (e.g., including new macro and/or Femto BS deployments).

Figure 8:
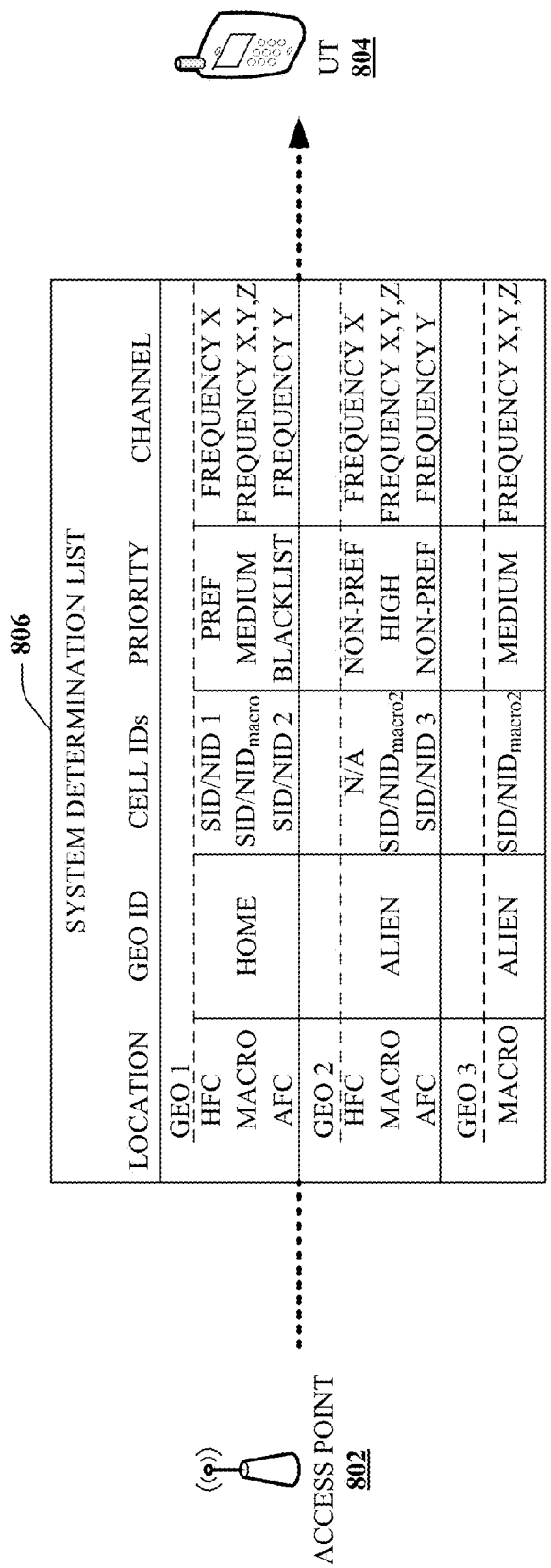
FIG. 8 depicts a block diagram of an example customized SDL that facilitates GEO-specific access point management according to some aspects.

FIG. 8 illustrates a block diagram of an example custom SDL 806 according to aspects of the subject disclosure. The SDL 806 can be provided by an access point 802 to UT 804 utilizing OTA communication, optionally during a bootstrap or pairing routine upon UT 804 start-up. The SDL 806 can be referenced by the UT 804 to identify available access points within a particular GEO, in which the UT 804 is currently located. Such current GEO can be broadcast by access point 802, or determined based on position location measurement (e.g., GPS), and so on.

As depicted, SDL 806 comprises three different GEOs, GEO 1, GEO 2 and GEO 3. GEO 1 is associated with a home Femto cell (HFC) of the UT 804, as well as one or more macro cells and one or more alien Femto cells (AFCs). Because the home Femto cell is contained within GEO 1, such GEO is indicated as a home GEO. Additionally, each access point is associated with a particular cell ID (e.g., SID/NID/cell ID), with which UT 804 can identify particular access points. Each access point is also given a priority. The home cell, given high priority in GEO 1, the macro access points given medium priority, and the alien Femto cells within GEO 1 are blacklisted (or optionally given low priority). Thus, UT 804 will acquire the home Femto cell so long as a signal of such cell is identified and rises above a relatively low threshold. Otherwise, a macro cell is selected. If an alien Femto cell is identified, a signal associated with such cell can be ignored.

GEOs 2 and 3 are both alien GEOs, which do not include a home Femto cell associated with UT 804. In GEO 2, which comprises at least one alien Femto cell, all Femto cells are given non-preferred priority and the macro cell(s) is given high priority. Accordingly, UT 804 will select the macro cell so long as a signal of such cell is above a relatively low threshold. An alien Femto cell can be accessed if a macro cell cannot be distinguished, optionally to initiate signaling with a mobile network if such signaling is allowed by the alien Femto cell. In some aspects, the UT 804 can attempt to register as a guest UT on the alien Femto cell, and obtain a specialized SDL in which the alien Femto cell is given a higher priority (e.g., medium or preferred status). With respect to GEO 3, which includes only macro cells, the UT 804 can connect to a macro cell. It should be appreciated that whenever UT 804 is connected to a non-preferred cell (or if a signal of a preferred cell drops below a relatively low threshold), UT 804 can periodically search for preferred cells in order to identify and acquire such cells. Thus, if the UT 804 is connected to a macro cell but travels from GEO 2 to GEO 1, the home Femto cell can eventually be identified.

In addition to the foregoing, the SDL 806 can indicate frequency channels employed by various access points. In a multi-carrier environment, where multiple channels are available, the UT 804 can search within and/or among such channels to identify cells, and periodically search for preferred cells when connected to medium or non-preferred cells. As depicted, SDL 806 can provide selective determination of network access points to facilitate identifying a preferred cell over other cells, depending on a particular GEO in which the UT 804 currently is located. Accordingly, an increased likelihood exists to obtain the preferred cells, leading to more efficient overall mobile communications.

Figure 9:
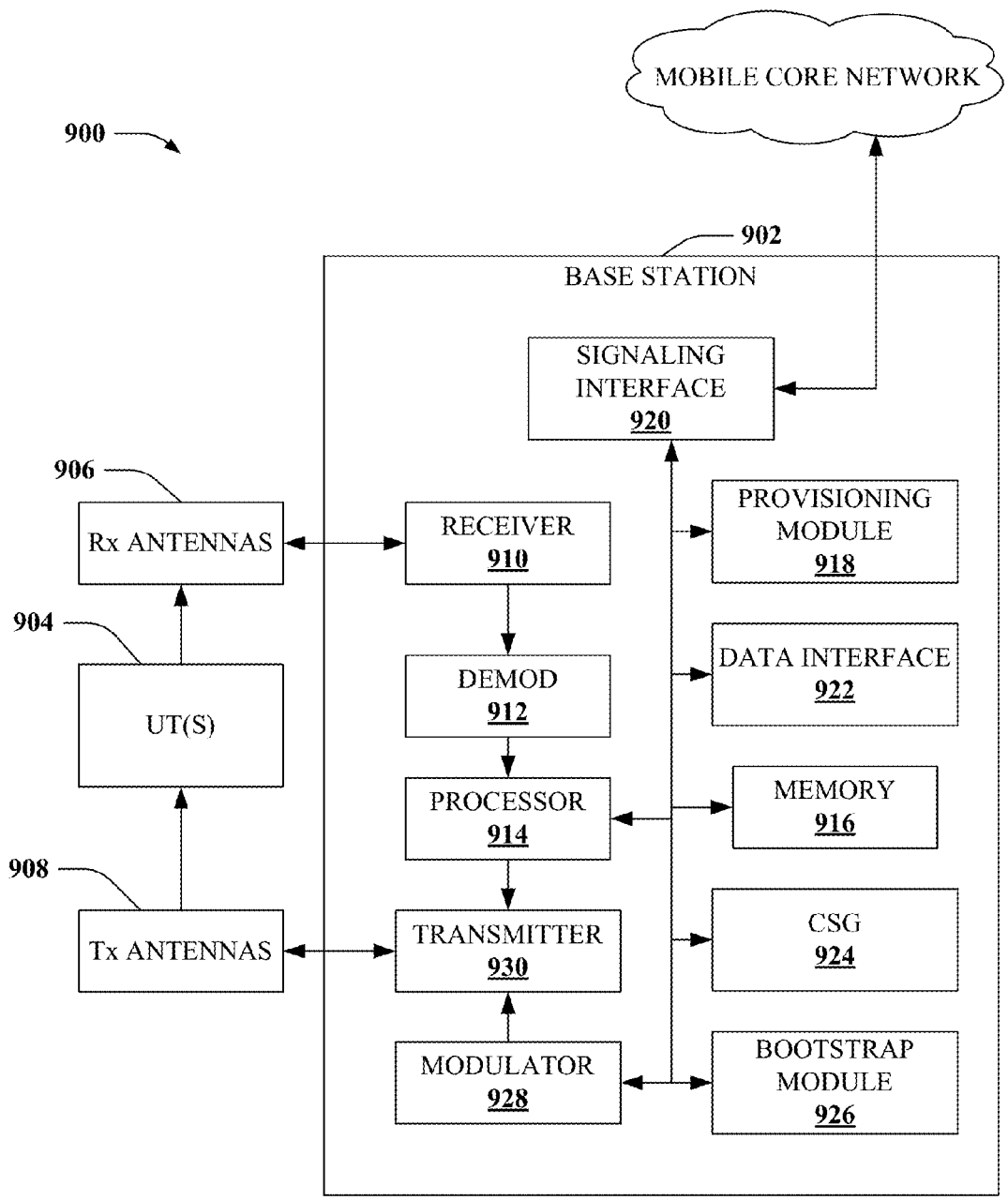
FIG. 9 illustrates a block diagram of an example system comprising a Femto BS communicatively coupled with one or more UTs according to some aspects.

FIG. 9 depicts a block diagram of an example system 900 comprising a BS 902 and one or more UTs 904 (e.g., mobile devices) according to aspects of the subject disclosure. BS 902 can be configured to provide selective access to disparate types of mobile network access points, as described herein. For UTs 904 configured to identify and distinguish between such types of access points, a customized SDL containing identifying information for the various types of access points, and priorities of such access points can be provided by BS 902. Where the UTs 904 are not configured to identify and/or distinguish between different types of access points, an SDL containing information identifying suitable macro network access points can be provided, enabling the UT(s) 904 to ignore non-macro access points.

BS 902 (e.g., access point, . . . ) can comprise a receiver 910 that receives signal(s), and over-the-air (OTA) messages from one or more UTs 904 through one or more receive antennas 906, and a transmitter 930 that transmits coded/modulated OTA signals and messages provided by modulator 928 to the one or more UTs 904 through a transmit antenna(s) 908. Receiver 910 can receive information from receive antennas 906 and can further comprise a signal recipient (not shown) that receives uplink data transmitted by UT(s) 904. Additionally, receiver 910 is operatively associated with a demodulator 912 that demodulates received information. Demodulated symbols are analyzed by a processor 914. Processor 914 is coupled to a memory 916 that stores information related to functions provided by BS 902. In one instance, stored information can comprise rules for obtaining various access point IDs and Femto-specific information and generating a Femto-specific SDL to the UT(s) 904. Additionally, stored information can comprise sets of parameters configured to establish preferred and non-preferred BSs (902).

Additionally, BS 902 can comprise a provisioning module 918 that employs capabilities of a UT (904) and customizes an SDL for the UT (904) based on such capabilities. For instance, if the UT is a Femto-capable device, provisioning module 918 can employ a signaling interface 920 to communication with a mobile core network and/or a Femto-specific database maintained by such network. The signaling interface can obtain subscriber information associated with the Femto-capable UT (904), and can further obtain home Femto cells associated with such UT from the Femto database. Optionally, where BS 902 is a Femto cell BS, subscriber information and Femto capabilities for UTs 904 included in a CSG 924 can be stored in memory 916 for internal use to the BS 902. Upon obtaining the subscriber and capability information, a customized SDL can be generated for Femto UTs 904, establishing a home Femto cell (902) as a preferred cell, and optionally establishing macro cells and/or alien cells as medium or low priority cells and blacklisted cells, respectively. In some aspects, BS 902 can comprise a data interface 922 to couple to the Internet, for communicating with other Femto BSs, or for coupling to the mobile core network (e.g., if BS 902 is a Femto cell BS).

According to one or more other aspects, BS 902 can comprise a bootstrap module 926 for initial UT provisioning. The bootstrap module 926 can employ a bootstrap node ID and/or bootstrap frequency channel to communicate with Femto UTs for initial provisioning, as described herein. The bootstrap module 926 can be utilized to establish a UT (904) as part of the CSG 924 during initial provisioning. In such case, the bootstrap module 926 can further provide a lower power transmission parameter for processor 914 to limit bootstrap communication to a relatively short range (e.g., less than 1 meter) to mitigate a likelihood of non-authorized UTs coupling with the BS 902 during bootstrapping procedures. Furthermore, the bootstrap module 926 can obtain nearby wireless conditions from a suitable UT (904) during such initial provisioning, to enable provisioning module 918 to customize an SDL to nearby network signals. Thus, for instance, nearby alien Femto cells can be blacklisted to prevent a UT (904) included in the CSG from performing an idle handoff to an alien Femto cell. As a result, the UT (904) can be more likely to remain coupled with BS 902 as opposed to transferring to other cells.

Figure 10:
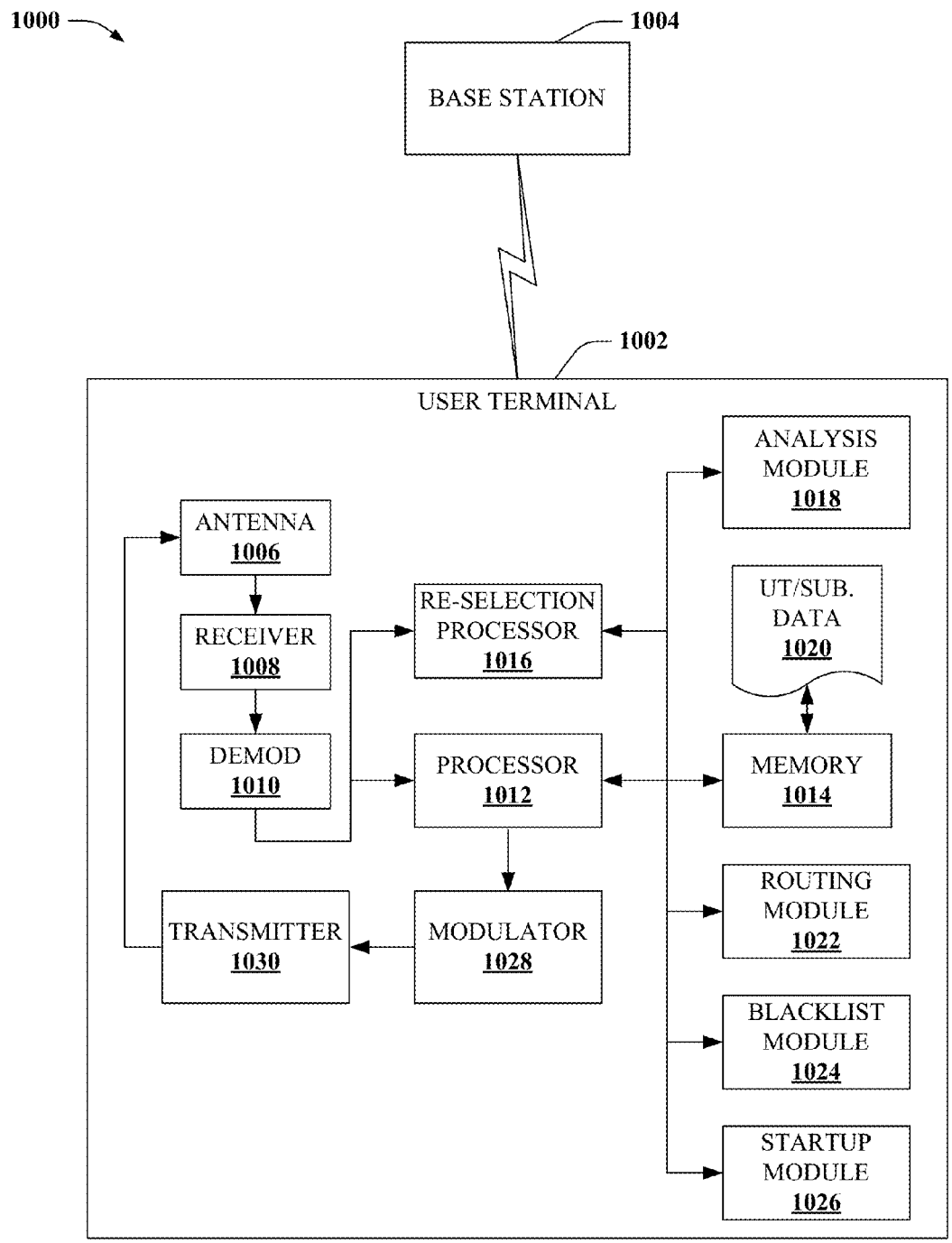
FIG. 10 depicts a block diagram of a sample system comprising a Femto-capable UT communicatively coupled with one or more BSs.

FIG. 10 illustrates a block diagram of an example system 1000 comprising a UT (e.g., mobile device) 1002 that can be configured to interface with a BS 1004. UT 1002 can be configured to wirelessly couple with one or more such BSs 1004 (e.g., access point) of a wireless network. Thus, for instance, UT 1002 can receive OTA signals from the BS 1004 on a FL channel and respond with OTA signals and messages on a RL channel, as known in the art. Furthermore, UT 1002 can obtain system determination information from the BS 1004 to selectively choose between access points to the wireless network. In some aspects, the UT 1002 can provide UT and/or subscriber specific information to facilitate generating a custom SDL based on capabilities of the UT 1002. The custom SDL can, for instance, establish one or more types of access points as preferred or non-preferred access points to facilitate such selective network access, as described herein.

UT 1002 includes at least one antenna 1006 (e.g., a transmission receiver or group of such receivers comprising an input interface) that receives a signal and receiver(s) 1008, which performs typical actions (e.g., filters, amplifies, down-converts, etc.) on the received signal. According to at least some aspects, a processor(s) 1012 can selectively analyze portions of signals received from demodulator 1010 and obtain synchronization and/or control information pertinent to a selected base station (1004) or type of base station. In general, antenna 1006 and transmitter 1034, which wirelessly sends modulated symbols provided by modulator 1028, (collectively referred to as a transceiver) can be configured to facilitate wireless data exchange with base station(s) 1004.

Antenna 1006 and receiver(s) 1008 can also be coupled with a demodulator 1010 that can demodulate received symbols and provide them to processor(s) 1012 for evaluation. It should be appreciated that processor(s) 1012 can control and/or reference one or more components (1006, 1008, 1010, 1014, 1016, 1018, 1020, 1022, 1024, 1026, 1028) of the UT 1002. Further, processor(s) 1012 can execute one or more modules, applications, engines, or the like (1016, 1018, 1022, 1024, 1026) that comprise information or controls pertinent to executing functions of the UT 1002. For instance, such functions can include scanning received wireless signals signal strength and/or quality statistics, employ a customized SDL to selectively access or handoff to particular B Ss (1004) or types of B Ss, or like operations, as described herein.

UT 1002 can additionally include memory 1014 that is operatively coupled to processor(s) 1012. Memory 1014 can store data to be transmitted, received, and the like, and instructions (1020) suitable to conduct wireless communication with a remote device (1004). Further, memory 1014 can store the modules, applications, engines, etc. (1016, 1018, 1022, 1024, 1026) executed by processor(s) 1012, above.

In addition to the foregoing, processor(s) 1012 and memory 1014 can be coupled to a re-selection module 1016 that can perform base station re-selection to acquire a network access point (1004), or identify and switch to a preferred access point (1004). The re-selection module 1016 can obtain such direction from a customized SDL obtained from BS 1004 and stored in memory 1014. Re-selection can comprise scanning wireless signals obtained at antenna 1006 and receiver 1008 to identify cell IDs of such signals and compare the cell IDs to the customized SDL.

To facilitate generating a customized SDL, processor(s) 1012 can provide data identifying UT 1002 or data associated with a subscriber from a subscriber profile 1020 stored in memory 1014. The subscriber data can be utilized to establish a home GEO for UT 1002 (e.g., based on subscriber address, zip code, or like data). In some aspects, processor(s) 1012 can query a user via a user interface (UI) of UT 1002 (not depicted) to obtain subscriber data, such as location data establishing the home GEO, or data identifying UT 1002, such as a phone number of the UT 1002, serial number, MSI, IMSI, or like data. Additionally, the subscriber profile 1020 and/or information obtained from the UI can indicate Femto-capabilities of UT 1002. The foregoing data can be forwarded to BS 1004 to generate the custom SDL, as described herein.

In addition to the foregoing, UT 1002 can comprise an analysis module 1018 for determining signal statistics of received wireless signals. The signal statistics can comprise signal strength and/or quality information. Such statistics can also be provided to BS 1004 in conjunction with initial start-up and/or acquisition routines (e.g., bootstrapping routines) implemented by startup module 1026 to configure the UT 1002 for communication with BS 1002, and/or for blacklisting nearby alien Femto cells, stored in a blacklisting module 1024. Statistical information can be sent to the BS 1004 via a routing module 1022, which can employ a particular bootstrapping channel to communicate with the BS 1004 during the start-up/acquisition routines. Upon completion of the start-up/acquisition routines, UT 1002 can employ the customized SDL to acquire a nearby access point (1004) and attempt to register onto a mobile network associated with the access point (1004).

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include Femto cells 210 coupled to provisioning module 302, Internet 240, core network 518, and UT 1002 or a different combination of these and other components. Sub-components could also be implemented as components communicatively coupled to other components rather than included within parent components. Additionally, it should be noted that one or more components could be combined into a single component providing aggregate functionality. For instance, signal analysis module 508 can include routing module 518, or vice versa, to facilitate analyzing received signal statistics and reporting such statistics to a home Femto cell by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 11-16. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 11:
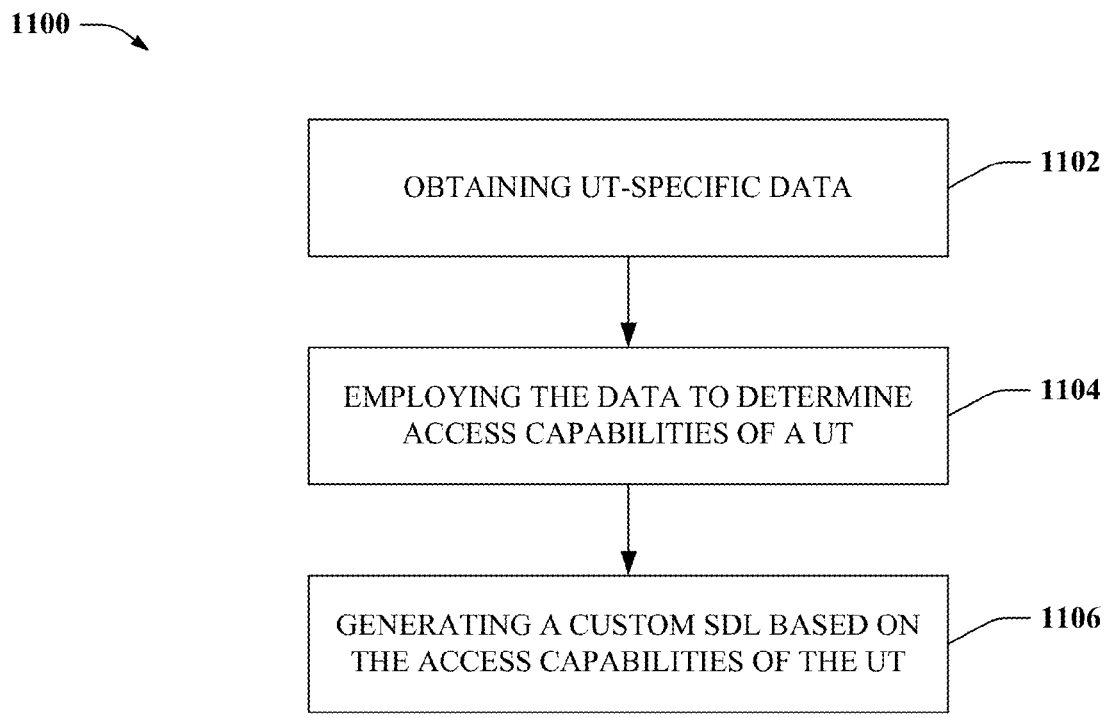
FIG. 11 illustrates a flowchart of an example methodology for providing centralized access point management in a mobile environment.

FIG. 11 depicts a flowchart of an example methodology 1100 for providing centralized access management in a mobile communication environment. At 1102, method 1100 can obtain UT-specific data. The data can include identifying information suitable to uniquely determine the UT. Such data can comprise a MSI, IMSI, ESN, or a like identifier of a UT. The data can be obtained via direct OTA communication with the UT, or via a network access point coupled with the UT. In the latter case, the data can be accompanied with an access request, utilized by the UT to access a mobile network.

At 1104, method 1100 can employ the UT-specific data to determine access capabilities of the UT. In some aspects, the data can be referenced against a Femto-database comprising data associated with Femto use or Femto subscription plans. The database can comprise a table that lists home Femto cells for various Femto-capable UTs, as well as authorized UTs for particular Femto cells. By accessing the Femto database, it can be determined whether the UT is a Femto-capable UT (e.g., if the UT-specific information is included in the database), what home Femto cells are associated with the UT, and information identifying a home GEO associated with each such home Femto cells.

As an alternative to the foregoing, or in addition thereto, the UT-specific data can be utilized to access an operator's home location register associated with the UT. In some such aspects, the Femto capabilities of the UT, as well as home Femto cells and GEOs of such cells, can also be obtained from the home location register. Alternatively, the UT-specific data can be included in a registration request submitted by the UT, and obtained directly or indirectly from the UT or from a serving cell associated with the UT. As an example, a user of the UT can submit the ID information and/or Femto capabilities (including a reference to home Femto/home GEO) into a UI of the UT. Such information can then be received in lieu of or in addition to accessing the Femto database or the operator's home location register.

At 1106, method 1100 can generate a custom SDL for the UT based at least in part on the access capabilities of the UT. The SDL can, for instance, include access information for macro cells near the UT if the UT is not Femto capable, and include both macro cell and Femto cell access information of the UT is Femto capable. In addition to the foregoing, the SDL can indicate a relative priority for types of access points (e.g., Femto, macro) based on the location of the UT. Thus, for instance, if the UT is currently in a home GEO, the Femto cell access information can be given high priority and the macro access information given a lower priority. The priority can facilitate an increased likelihood that the UT will access and remain coupled with a Femto cell. In some aspects, the custom SDL can identify a particular home Femto cell of the UT, so such cell can be identified by the UT. The home Femto cell can be given highest priority. In further aspects, alien Femto cells can also be identified, and given lowest priority, or can be blacklisted in the custom SDL. Accordingly, the UT can avoid wasted signaling to the alien Femto cells. Once the custom SDL is generated, it can be forwarded to the UT for selectively accessing various network access points based at least on access point type.

Figure 12:
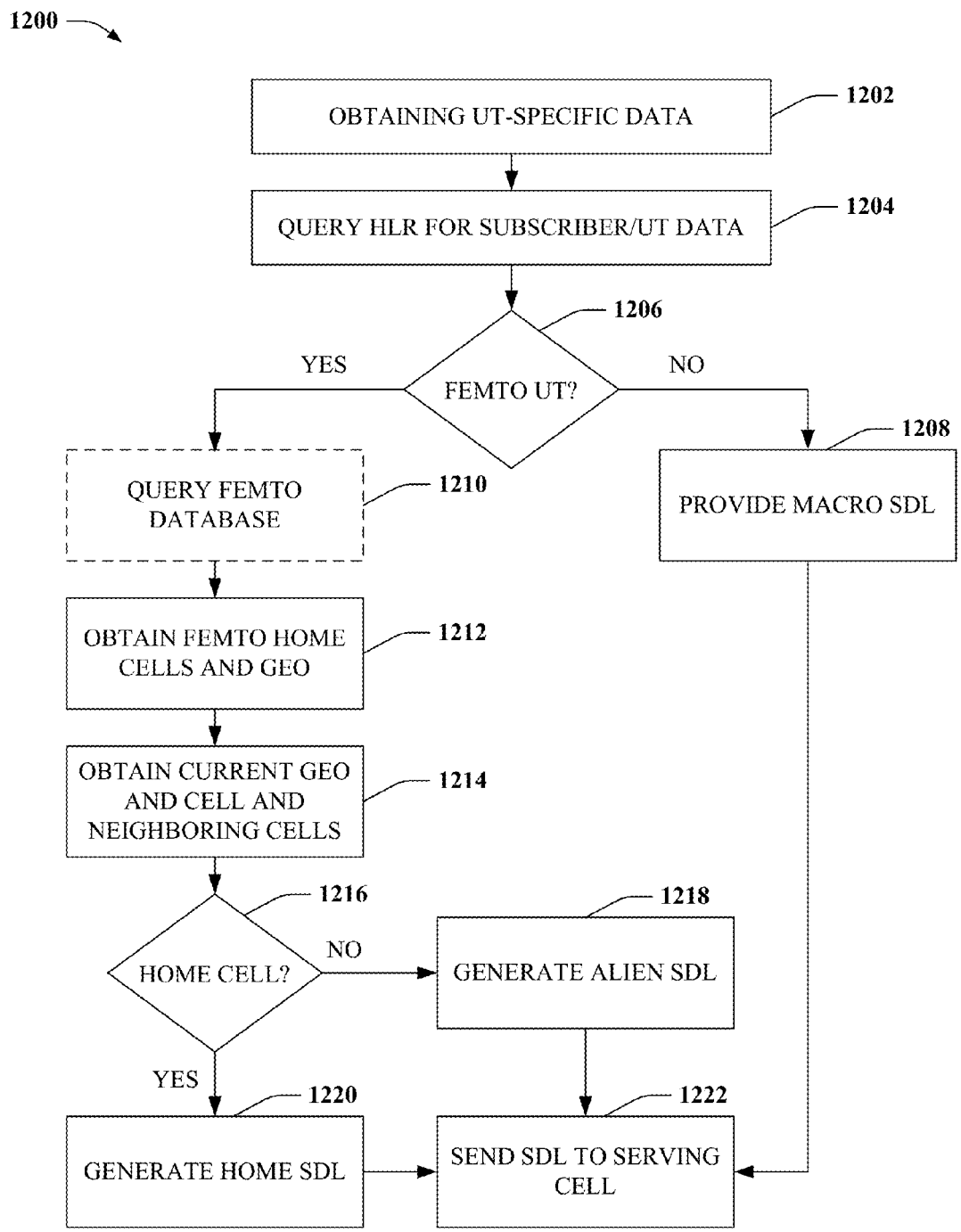
FIG. 12 illustrates a flowchart of an example methodology for obtaining UT-specific information to generate a customized SDL according to some aspects.

FIG. 12 depicts a flowchart of an example methodology 1200 for obtaining UT-specific data to generate a customized SDL for a UT. At 1202, method 1200 can obtain UT-specific data from a UT, as described herein. At 1204, method 1200 can query an HLR for subscriber data associated with the UT. At 1206, a determination is made as to whether the UT is a Femto-capable UT, based at least in part on the subscriber data. If the UT is not a Femto-capable UT, method 1200 can proceed to 1208, where a macro SDL establishing priority to macro access points is generated and provided to the UT at 1222.

If the UT is determined to be a Femto-capable UT, method 1200 can proceed to 1210. At 1210, method 1200 can optionally (as indicated by the dashed lines) query a Femto database for a home Femto cell(s) and related information pertinent to the UT. Alternatively, method 1200 can obtain the Femto cell(s) and related information dynamically from the network HLR, or from the UT instead of accessing a Femto database. In either case, method 1200 can obtain a Femto home cell(s) and home GEO(s) pertaining to the UT at 1212. Additionally, at 1214, method 1200 can obtain a current GEO for the UT, as well as neighboring cells within such GEO. AT 1216, method 1200 can determine whether the UT is within a home cell or home GEO. If not, method 1200 can proceed to 1218 where a customized SDL in an alien Femto environment can be generated. Such an alien SDL can give low priority to alien Femto cells, or blacklist such cells, and give relatively high priority to macro cells. If, on the other hand, the UT is determined to be within the home cell or home GEO at reference number 1216, method 1200 can proceed to 1220 where a home SDL can be generated for the UT. The home SDL can identify and give high priority to a home Femto cell associated with the UT. At 1222, method 1200 can send the customized SDL, whether macro, alien or home Femto, to the UT.

Figure 13:
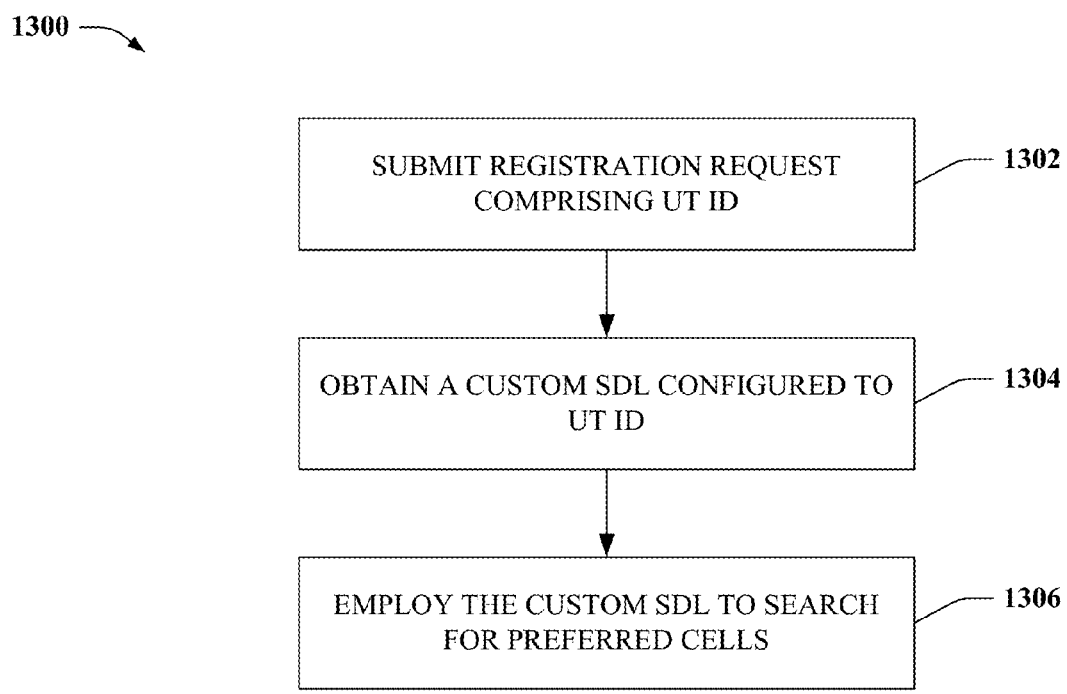
FIG. 13 depicts a flowchart of a sample methodology for employing a custom SDL to access a mobile network.

FIG. 13 depicts a flowchart of an example methodology for accessing a mobile network. At 1302, method 1300 can submit a registration request comprising an ID of a requesting UT. The ID can comprise any suitable information that can be utilized to distinguish the UT from other such UTs. According to some aspects, the registration request can optionally include access capabilities of the UT, such as whether the UT is configured to access a Femto cell, ID information of a home Femto cell (e.g., SID/NID/cell ID) and frequency channels employed by such cell, as well as a current location or GEO of the UT, and an ID of a BS currently serving the UT.

At 1304, method 1300 can obtain an SDL customized to the UT information submitted at reference number 1302. Thus, for instance, the customized SDL can include information identifying a home Femto cell, alien Femto cells and/or nearby macro cells within a current GEO occupied by the UT. In other aspects, the SDL can provide relative priority for various access points as a function of access point type, as well as frequency channels utilized by the various access points. Based on relative priority, the UT can select among various received signals to identify a preferred access point. If the preferred access point is not located on a particular frequency channel, the UT can switch channels to further the attempt to locate the preferred access point. If, however, such access point cannot be found, the UT can select a non-preferred cell, or a cell given no particular preference (or, e.g., medium preference). However, the UT can periodically scan received signals and available frequency channels to continue to attempt to obtain the preferred cell. Such periodic scanning can continue until the preferred cell is found, or until a new SDL is provided to the UT (e.g., if the UT moves to a new GEO, if the network topology changes, the UT powers off and on, or the like), which does not include a preferred cell.

Figure 14:
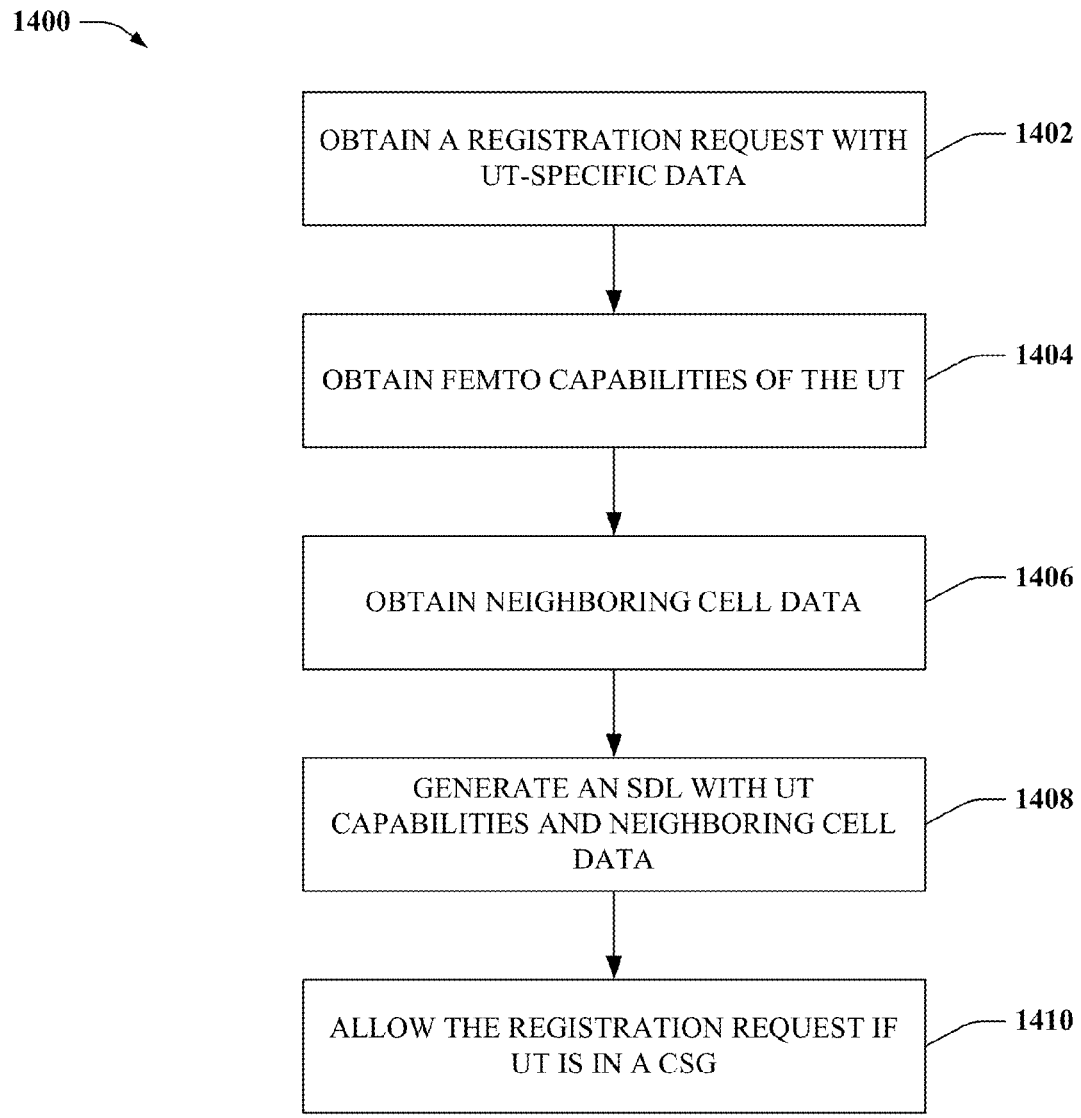
FIG. 14 depicts a flowchart of an example methodology for providing distributed access point management in a mobile environment.

FIG. 14 illustrates a flowchart of an example methodology for providing distributed access management in a mobile communication environment. At 1402, method 1400 can obtain a registration request with UT-specific data, as described herein. At 1404, method 1400 can obtain Femto capabilities of the requesting UT (e.g., from such UT, from a Femto database, from an operator's HLR, and so on). At 1406, method 1400 can obtain neighboring cell data, for cells within a particular GEO in which the UT is located, or cells near to a serving cell coupled to the UT. The neighboring cell data can be obtained from a network component, or from the UT, which can analyze signals transmitted by neighboring cells and provide statistics of such signals as an analysis of network environment near the UT. At 1408, method 1400 can generate an SDL with UT capabilities and neighboring cell data. The UT capabilities can be utilized to customize the SDL to enable selective access point management by the UT, as described herein. Additionally, the neighboring cell data can be utilized by the UT to search for a preferred cell, if any, indicated in the SDL. In at least one aspect, the neighboring cell data can be utilized to blacklist one or more non-preferred access points within the vicinity of a serving cell, if the serving cell is a preferred access point (e.g., a home Femto cell). By utilizing data of neighboring cells, a relatively small blacklist of cells can be maintained, lowering processing and memory requirements to analyze and store, respectively, the customized SDL.

Figure 15:
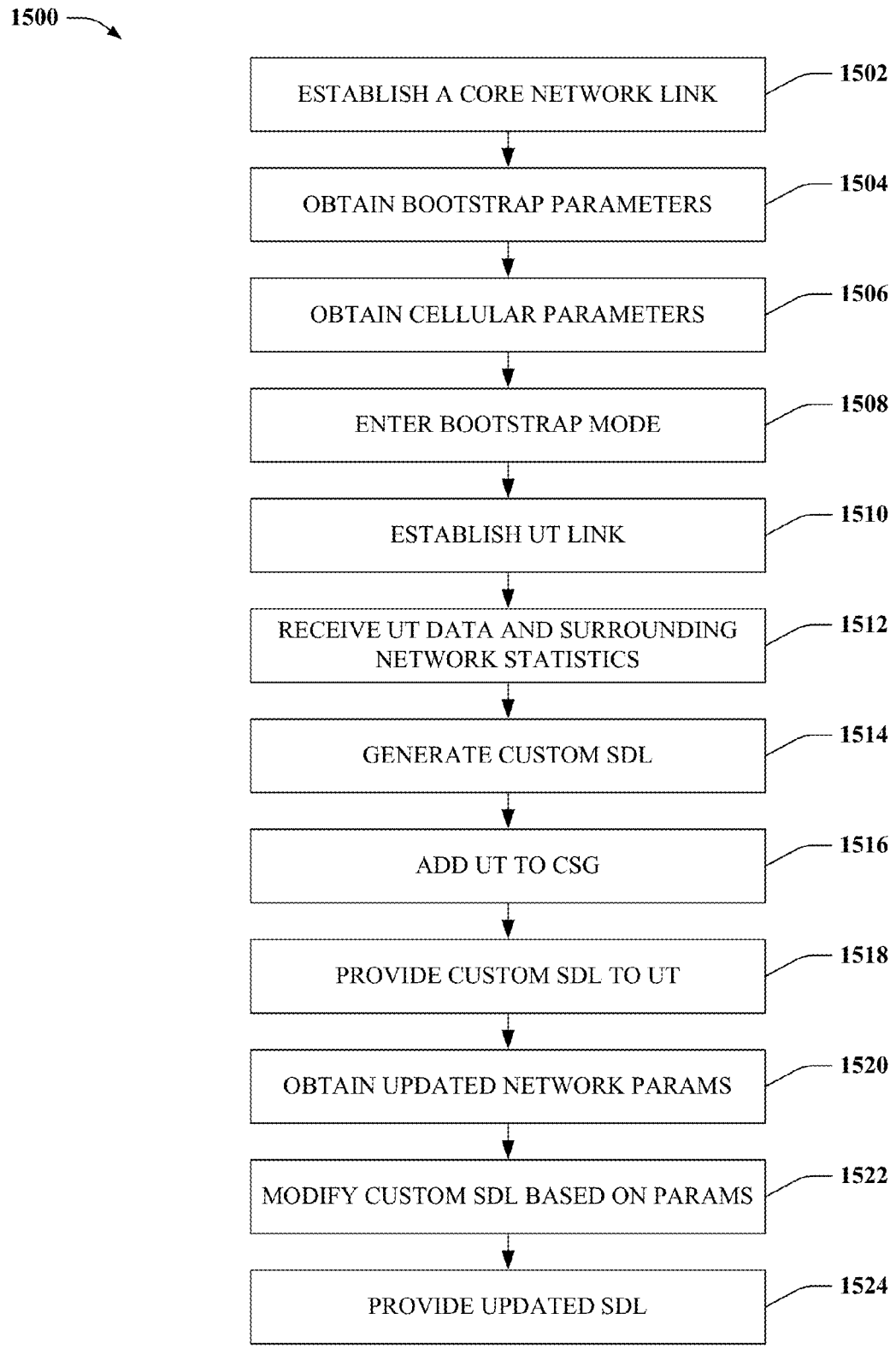
FIG. 15 illustrates a flowchart of an example methodology for interfacing with a Femto cell to generate an SDL customized for a particular UT.

FIG. 15 depicts a flowchart of an example methodology for employing start-up routines to couple to a UT and generate a custom SDL for the UT based on access capabilities of the UT. At 1502, method 1500 can establish a core network link with a core mobile network. At 1504, method 1500 can obtain bootstrap parameters for initial acquisition of a nearby UT. AT 1506, method 1500 can obtain cellular parameters for cellular communication with remote devices. AT 1508, method 1500 can enter a bootstrap provisioning mode. At 1510, method 1500 can establish a link with a nearby UT. The link can optionally utilize a particularly low transmit power, enabling communication only with a UT within a close proximity. At 1512, method 1500 can receive UT data and surrounding network statistics from the UT. At 1514, method 1500 can generate a custom SDL for the UT based on the UT data and network statistics. At 1516, method 1500 can add the UT to a CSG, establishing the UT as an authorized UT. At 1518, method 1500 can provide the customized SDL to the UT. At 1520, method 1500 can obtain updated network topology parameters from a network. The updated network topology parameters can include additional and/or modified UT data within a surrounding GEO. At 1522, method 1500 can modify the custom SDL provided to the UT based on the updated network topology parameters. At 1524, method 1500 can provide the updated SDL to the UT, to facilitate access point selection in the updated network environment.

Figure 16:
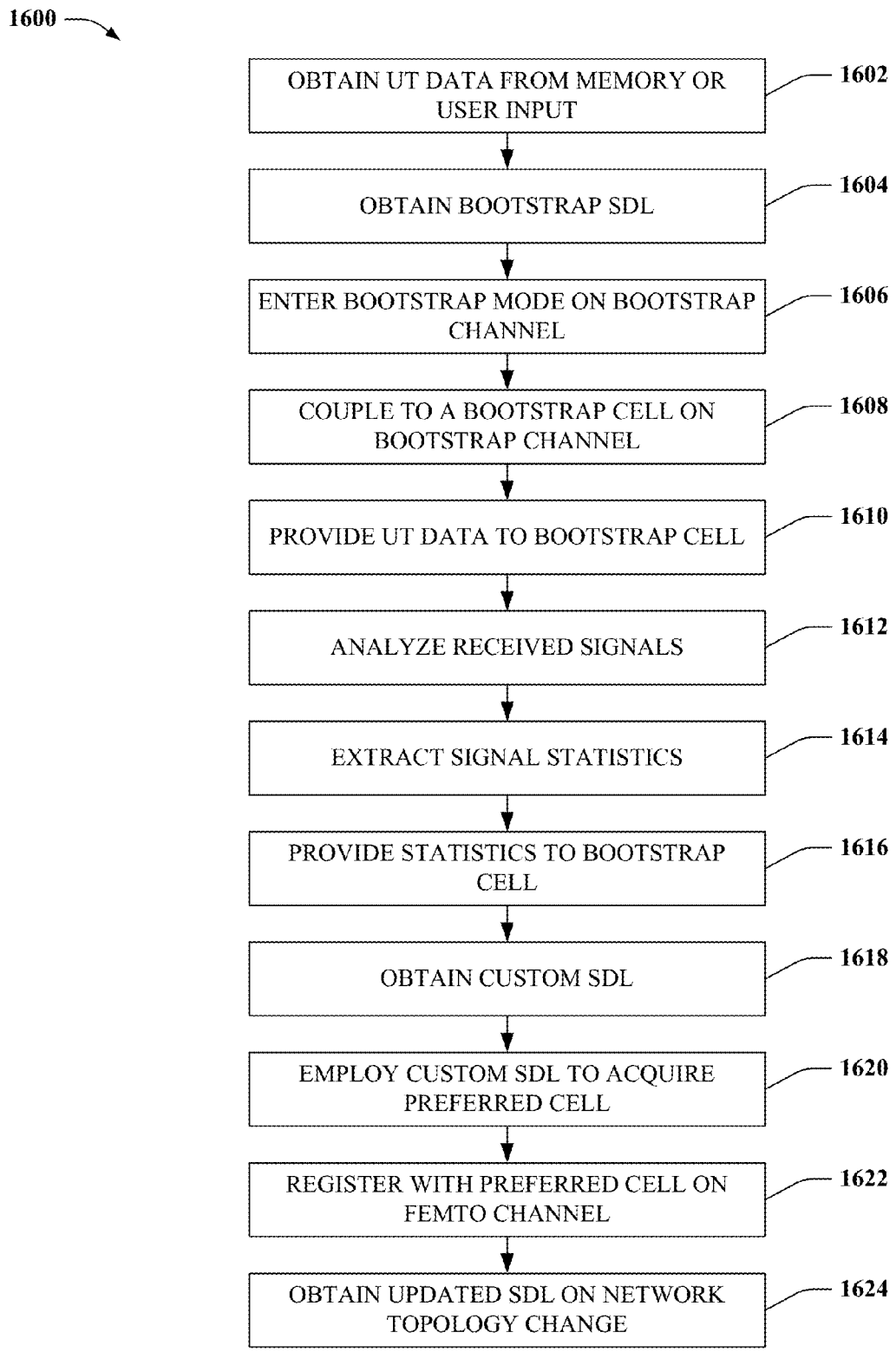
FIG. 16 illustrates a flowchart of a sample methodology for employing a custom SDL to select preferred access points to a mobile network.

FIG. 16 illustrates a flowchart of an example methodology for facilitating generation of a custom SDL based on UT-specific data and UT-specific access capabilities. At 1602, method 1600 can obtain UT data from memory or from user input. At 1604, method 1600 can obtain a bootstrap SDL. The bootstrap SDL can be obtained, for instance, from a mobile network by employing a GA BS associated with the network (e.g., a macro BS). At 1606, method 1600 can enter a bootstrap start-up and/or acquisition mode on a bootstrap channel provided by the bootstrap SDL. At 1608, method 1600 can couple to a bootstrap cell (e.g., identified by a bootstrap NID) on the bootstrap channel. At 1610, method 1600 can provide UT data to the bootstrap cell. At 1612, method 1600 can analyze received wireless signals from a surrounding network, optionally excluding signals obtained from the bootstrap cell. At 1614, method 1600 can extract signal statistics, such as signal strength, signal quality, and the like, from the received wireless signals. At 1616, method 1600 can provide the extracted signal statistics to the bootstrap cell. At 1618, method 1600 can obtain a customized SDL based on the UT data and extracted signal statistics. At 1620, method 1600 can employ the customized SDL to search for and acquire a preferred network cell. At 1622, method 1600 can register with the preferred cell on a Femto frequency channel specified in the customized SDL. At 1624, method 1600 can obtain an updated SDL based on changes in network topology information.

Figure 17:
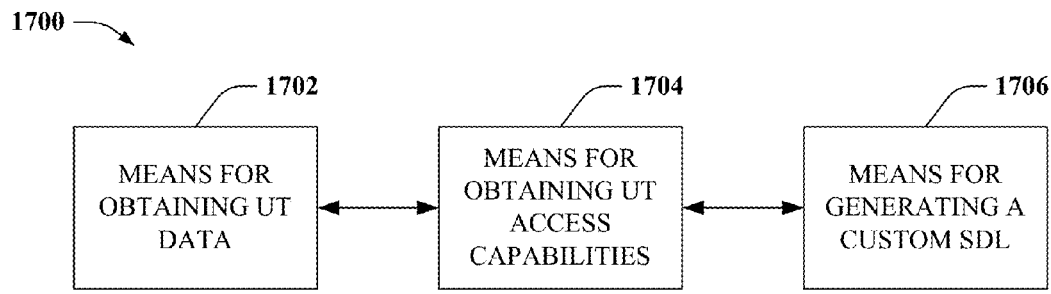
FIG. 17 depicts a block diagram of an example system that provides centralized access point management for mobile networking.
Figure 18:
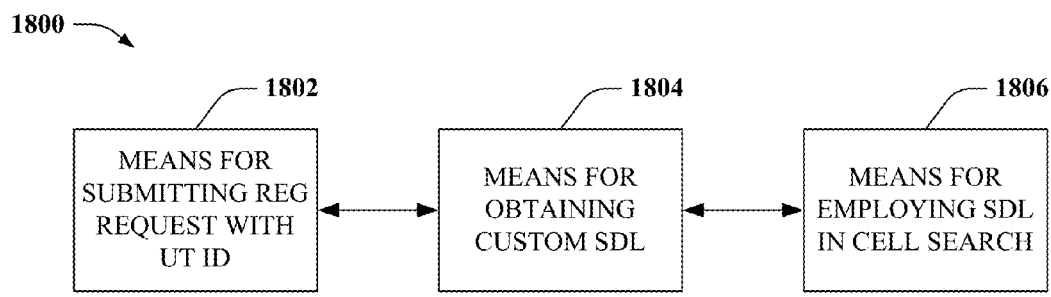
FIG. 18 illustrates a block diagram of an example system that employs a custom SDL to access mobile network BSs.

FIGS. 17 and 18 depict block diagrams of example systems 1700, 1800 that facilitate and utilize, respectively, centralized access point management for access points of a mobile network, as described herein. For example, systems 1700, 1800 can reside at least partially within a wireless communication network and/or within a transmitter such as a node, base station, access point, user terminal, personal computer coupled with a mobile interface card, or the like. It is to be appreciated that systems 1700, 1800 are represented as including functional blocks, which can be functional blocks that represent functions implemented by a processor, software, or combination thereof (e.g., firmware).

System 1700 can comprise a first means 1702 for obtaining data pertaining to a UT. The data can comprise information distinguishing the UT from other such UT's, as well as identifying an operator providing mobile services for the UT. A second means 1704 can employ the data to obtain access capabilities of the UT. The capabilities can be obtained from a Femto database if the UT is identified as a Femto-capable UT. Alternatively, or in addition, the capabilities can be obtained from an operator's HLR maintained at the operator's core network. In other aspects of the subject disclosure, the capabilities can be obtained with the data pertaining to the UT, or derived directly or indirectly from such data (e.g., where the data or a hash of such data yields the capabilities). System 1700 can further comprise a third means 1706 for generating a custom SDL. The custom SDL can list mobile network access points that can be employed by the UT based at least in part on the UT capabilities. In some aspects, the network access points can be filtered as a function of a current GEO in which the UT is located. Furthermore, the access points can be given a particular order of priority or preference, facilitating selective access to and/or acquisition of one or more such access points. In at least one such aspect, the order/priority can be based on capabilities of the UT. Thus, for instance, where the UT is a Femto-capable device, priority can be given to Femto access points or a home access point associated with the UT. Where the UT is not Femto capable, priority can be given to access points of another type, such as GA macro access points.

System 1800 can comprise a first means 1802 for submitting a registration request to an access point of a mobile network, where the registration request comprises an ID of a requesting device. Furthermore, the system 1800 can comprise a second means 1800 for obtaining a customized SDL based at least in part on the ID of the requesting device. The SDL can, for instance, identify and give high priority to a particular access point associated with the requesting device. In addition to the foregoing, system 1800 can comprise a third means 1806 for employing the customized SDL to search for and/or acquire an access point identified in the SDL. Such means 1806 can employ an access point preference specified in the SDL in conducting the search. Thus, cells having higher preference can be selected over other cells. Where a preferred cell cannot be identified by means 1806, the means 1806 can select a lower preferred or non-preferred cell for network access. In such case, however, the means can periodically re-initiate the search to identify the preferred access point. If the preferred access point is identified, system 1800 can connect to such access point and request mobile services there from. Additionally, where the preferred access point is identified, means 1806 can decrease a threshold below which system 1800 will search for other cells in lieu of the preferred access point, to increase a likelihood that system 1800 will remain coupled with the preferred access point.

Figure 19:
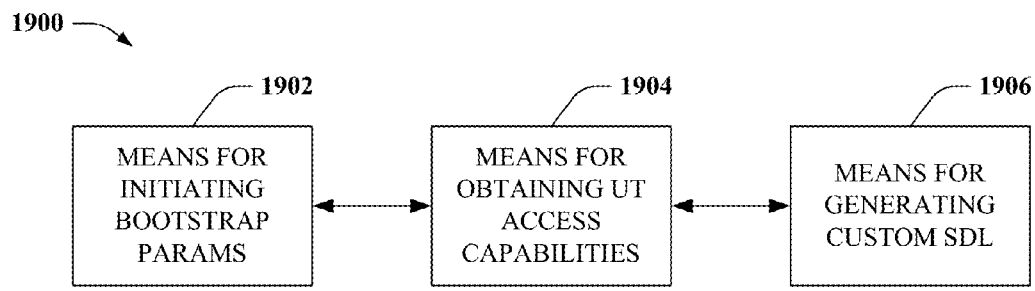
FIG. 19 illustrates a block diagram of an example system that provides distributed access point management for mobile networking.
Figure 20:
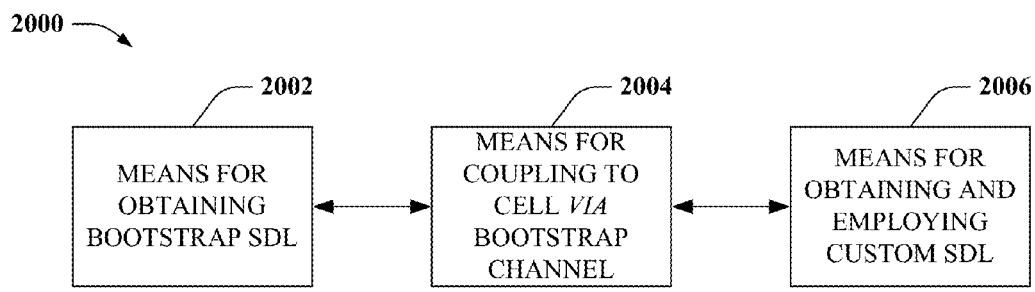
FIG. 20 depicts a block diagram of an example system that facilitates distributed access point management for mobile network.

FIGS. 19 and 20 depict block diagrams of example systems 1900, 2000 that facilitate and utilize, respectively, centralized access point management for access points of a mobile network, as described herein. For example, systems 1900, 2000 can reside at least partially within a wireless communication network and/or within a transmitter such as a node, base station, access point, user terminal, personal computer coupled with a mobile interface card, or the like. It is to be appreciated that systems 1900, 2000 are represented as including functional blocks, which can be functional blocks that represent functions implemented by a processor, software, or combination thereof (e.g., firmware).

System 1900 comprises a first means 1902 for initiating a bootstrap mode based on bootstrap parameters. Such parameters can specify a frequency channel for wireless communications associated with the bootstrap mode, a bootstrap ID for identifying the system 1900, as well as transmit power of the wireless communications during bootstrap mode. Additionally, system 1900 can include a second means 1904 for obtaining UT access capabilities via wireless data exchange. Further, system 1900 can comprise a third means 1906 for generating a custom SDL based on the access capabilities. The custom SDL can indicate a preference for one or more types of access points based on the capabilities of the UT. In some aspects, a home access point associated with the UT can be identified and listed as a highest priority access point in the SDL, to facilitate an increased likelihood of searching for and acquiring the home access point. According to particular aspects, the SDL can also blacklist access points determined to be within a close proximity of the preferred access point, based on relative signal strength of such proximate access points. Accordingly, the SDL can facilitate reduced likelihood that the UT will avoid the preferred access point in favor of other such access points.

System 2000 comprises a first means 2002 for obtaining a bootstrap SDL. The bootstrap SDL can be obtained, for instance, via OTA provisioning from components of a mobile network. Additionally, system 2000 can comprise a second means 2004 for coupling to a cell via a bootstrap channel specified in the bootstrap SDL. Additionally, a system, node and/or cell ID of the cell can be extracted from the bootstrap SDL to facilitate identifying such cell. Furthermore, system 2000 can comprise a third means 2006 for obtaining and employing a custom SDL in selecting access points of a mobile network. The custom SDL can indicate typical radio frequency channels employed by the access points to facilitate the search and access. Furthermore, the custom SDL can identify such cells by a cell ID, or like identifier. System 2000, therefore, can end the communication with the cell and initiate search for a cell specified in the custom SDL, and attempt to obtain mobile services from such specified cell. The custom SDL can optionally be based on one or more surrounding GEOs in which system 2000 resides. As system 2000 moves from one GEO to another, the SDL can be referenced to determine which cells should be utilized to access the network. Where specified cells cannot be identified, general purpose cells can be employed instead, such as macro network cells. In such case, system 2000 can continue to search for cells specified by the SDL while coupled to the network via the general purpose cells.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of operating a user terminal (UT) configured for selective access to a mobile network, comprising:
    obtaining a bootstrap system determination list (SDL);
    coupling to an access point via a bootstrap channel of the access point that is specified in the bootstrap SDL, wherein the access point is configured to provide data service in accordance with a closed subscriber group (CSG) protocol and wherein communication over the bootstrap channel is permitted to bypass the CSG protocol;
    obtaining a custom SDL from the access point over the bootstrap channel, wherein the custom SDL specifies (i) at least one preferred mobile network access point or (ii) at least one preferred type of mobile network access point based on an access capability of the UT; and
    attempting to initiate wireless communication with a target access point based on the custom SDL.

2. The method of claim 1, wherein the coupling occurs in conjunction with an initial power-up procedure of the UT or in conjunction with a transition of the UT between different access network types.

3. The method of claim 2, where the different access network types are third generation partnership project (3GPP) systems and 3GPP2 systems.

4. The method of claim 1,
    wherein the at least one preferred mobile network access point includes a small base station, or
    wherein the at least one preferred type of mobile network access point includes a small base station type.

5. The method of claim 4,
    wherein the small base station is a pico access point or a femto access point, or
    wherein the small base station type is a pico access point type or a femto access point type.

6. The method of claim 1,
    wherein the access point corresponds to a small base station or a macro base station.

7. The method of claim 1, wherein the bootstrap SDL specifies a Network Identifier (NID) of the at least one preferred mobile network access point and/or a small base station System Identifier (SID) that is separate from any macro SIDs.

8. The method of claim 1, wherein the bootstrap channel is range-limited compared to traffic channels supported by the access point.

9. The method of claim 8, wherein the bootstrap channel is limited to 1 meter or less.

10. The method of claim 1,
    wherein the custom SDL excludes one or more access points or one or more access point types to which the UT cannot obtain data service based on the access capability, and
    wherein the access capability indicates an inability of the UT to couple to the excluded one or more access points or the excluded one or more access point types and/or subscription information that indicates the UT will not be provided the data service by the excluded one or more access points or the excluded one or more access point types.

11. A user terminal (UT) configured for selective access to a mobile network, comprising:
    means for obtaining a bootstrap system determination list (SDL);
    means for coupling to an access point via a bootstrap channel of the access point that is specified in the bootstrap SDL, wherein the access point is configured to provide data service in accordance with a closed subscriber group (CSG) protocol and wherein communication over the bootstrap channel is permitted to bypass the CSG protocol;
    means for obtaining a custom SDL from the access point over the bootstrap channel, wherein the custom SDL specifies (i) at least one preferred mobile network access point or (ii) at least one preferred type of mobile network access point based on an access capability of the UT; and
    means for attempting to initiate wireless communication with a target access point based on the custom SDL.

12. The UT of claim 11, wherein the means for coupling couples in conjunction with an initial power-up procedure of the UT or in conjunction with a transition of the UT between different access network types.

13. The UT of claim 11,
    wherein the at least one preferred mobile network access point corresponds includes a small base station, or
    wherein the at least one preferred type of mobile network access point includes a small base station type.

14. The UT of claim 13,
    wherein the small base station is a pico access point or a femto access point, or wherein the small base station type is a pico access point type or a femto access point type.

15. The UT of claim 11, wherein the access point corresponds to a small base station or a macro base station.

16. The UT of claim 11, wherein the bootstrap channel is range-limited compared to traffic channels supported by the access point.

17. The UT of claim 11,
wherein the custom SDL excludes one or more access points or one or more access point types to which the UT cannot obtain data service based on the access capability, and
wherein the access capability indicates an inability of the UT to couple to the excluded one or more access points or the excluded one or more access point types and/or subscription information that indicates the UT will not be provided the data service by the excluded one or more access points or the excluded one or more access point types.

18. A user terminal (UT) configured for selective access to a mobile network, comprising:
a processor configured to:
obtain a bootstrap system determination list (SDL);
couple to an access point via a bootstrap channel of the access point that is specified in the bootstrap SDL, wherein the access point is configured to provide data service in accordance with a closed subscriber group (CSG) protocol and wherein communication over the bootstrap channel is permitted to bypass the CSG protocol;
obtain a custom SDL from the access point over the bootstrap channel, wherein the custom SDL specifies (i) at least one preferred mobile network access point or (ii) at least one preferred type of mobile network access point based on an access capability of the UT; and
attempt to initiate wireless communication with a target access point based on the custom SDL.

19. The UT of claim 18, wherein the processor couples in conjunction with an initial power-up procedure of the UT or in conjunction with a transition of the UT between different access network types.

20. The UT of claim 18,
wherein the at least one preferred mobile network access point includes a small base station, or
wherein the at least one preferred type of mobile network access point includes a small base station type.

21. The UT of claim 20,
wherein the small base station is a pico access point or a femto access point, or
wherein the small base station type is a pico access point type or a femto access point type.

22. The UT of claim 18, wherein the access point corresponds to a small base station or a macro base station.

23. The UT of claim 18, wherein the bootstrap channel is range-limited compared to traffic channels supported by the access point.

24. The UT of claim 18,
wherein the custom SDL excludes one or more access points or one or more access point types to which the UT cannot obtain data service based on the access capability, and
wherein the access capability indicates an inability of the UT to couple to the excluded one or more access points or the excluded one or more access point types and/or subscription information that indicates the UT will not be provided the data service by the excluded one or more access points or the excluded one or more access point types.

25. A non-transitory computer-readable medium containing instructions stored thereon, which, when executed by a user terminal (UT) configured for selective access to a mobile network, causes the UT to perform operations, the instructions comprising:
at least one instruction to cause the UT to obtain a bootstrap system determination list (SDL);
at least one instruction to cause the UT to couple to an access point via a bootstrap channel of the access point that is specified in the bootstrap SDL, wherein the access point is configured to provide data service in accordance with a closed subscriber group (CSG) protocol and wherein communication over the bootstrap channel is permitted to bypass the CSG protocol;
at least one instruction to cause the UT to obtain a custom SDL from the access point over the bootstrap channel, wherein the custom SDL specifies (i) at least one preferred mobile network access point or (ii) at least one preferred type of mobile network access point based on an access capability of the UT; and
at least one instruction to cause the UT to attempt to initiate wireless communication with a target access point based on the custom SDL.

26. The non-transitory computer-readable medium of claim 25,
wherein the processor couples in conjunction with an initial power-up procedure of the UT or in conjunction with a transition of the UT between different access network types.

27. The non-transitory computer-readable medium of claim 25,
wherein the at least one preferred mobile network access point corresponds to a small base station, or
wherein the at least one preferred type of mobile network access point includes a small base station type.

28. The non-transitory computer-readable medium of claim 25,
wherein the access point corresponds to a small base station or a macro base station.

29. The non-transitory computer-readable medium of claim 25,
wherein the bootstrap channel is range-limited compared to traffic channels supported by the access point.

30. The non-transitory computer-readable medium of claim 25,
wherein the custom SDL excludes one or more access points or one or more access point types to which the UT cannot obtain data service based on the access capability, and
wherein the access capability indicates an inability of the UT to couple to the excluded one or more access points or the excluded one or more access point types and/or subscription information that indicates the UT will not be provided the data service by the excluded one or more access points or the excluded one or more access point types.

* * * * *